US012726872B2

(12) United States Patent
Wang

(10) Patent No.: US 12,726,872 B2
(45) Date of Patent: Sep. 1, 2026

(54) CHANNEL SWITCHING METHOD, ELECTRONIC DEVICE, AND STORAGE MEDIUM

(71) Applicant: HONOR DEVICE CO., LTD., Shenzhen (CN)

(72) Inventor: Jinxiang Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 455 days.

(21) Appl. No.: 18/037,978

(22) PCT Filed: Jan. 19, 2022

(86) PCT No.: PCT/CN2022/072713
§ 371 (c)(1),
(2) Date: May 19, 2023

(87) PCT Pub. No.: WO2023/273317
PCT Pub. Date: Jan. 5, 2023

(65) Prior Publication Data

US 2024/0089822 A1 Mar. 14, 2024

(30) Foreign Application Priority Data

Jun. 29, 2021 (CN) ......................... 202110729329.1

(51) Int. Cl.
*H04W 36/30* (2009.01)
*H04W 24/04* (2009.01)
*H04W 36/00* (2009.01)

(52) U.S. Cl.
CPC .......... *H04W 36/30* (2013.01); *H04W 24/04* (2013.01); *H04W 36/0011* (2013.01)

(58) Field of Classification Search
CPC ............... H04W 12/088; H04W 24/04; H04W 36/0011; H04W 36/30; H04W 36/304; H04W 36/36; H04W 4/027; H04W 84/12
See application file for complete search history.

(56) References Cited

U.S. PATENT DOCUMENTS

| | | | | |
|---|---|---|---|---|
| 6,944,158 | B1 * | 9/2005 | Wilson | H04L 45/58 370/392 |
| 8,089,888 | B2 | 1/2012 | Krishnamurthi et al. | |
| 8,463,433 | B2 * | 6/2013 | Nagasaka | B25J 13/084 700/263 |
| 9,148,381 | B2 | 9/2015 | Dunlap et al. | |

(Continued)

FOREIGN PATENT DOCUMENTS

| | | |
|---|---|---|
| CN | 101119314 A | 2/2008 |
| CN | 102448150 A | 5/2012 |

(Continued)

*Primary Examiner* — Dung B Huynh
(74) *Attorney, Agent, or Firm* — WOMBLE BOND DICKINSON (US) LLP

(57) ABSTRACT

Embodiments of this application provide a channel switching method, an electronic device, and a storage medium, and relate to the field of communication technologies. The method includes: in response to a monitored scenario change, detecting a second network channel based on a service type of the first application, and determining a path of the second network channel based on a detection result; obtaining packets of the first application on the first network channel; and determining a characteristic packet flow from a plurality of packet flows of the first application, collecting statistics on packets in the characteristic packet flow to obtain a first statistical result, and switching the characteristic packet flow to the second network channel based on the first statistical result. The method provided by the embodiments of this application can improve switching efficiency of the network channel, thereby ensuring running smoothness of an application.

18 Claims, 14 Drawing Sheets

(56) References Cited

U.S. PATENT DOCUMENTS 9,210,625 B1 * 12/2015 Lovlekar ........... H04W 36/0066
9,585,184 B1 * 2/2017 Sheriff .................. H04W 76/15
9,893,995 B1 * 2/2018 Sharma .................. H04L 69/14
9,906,989 B2 2/2018 Buckle et al.
9,948,708 B2 4/2018 Wormley
10,129,690 B2 * 11/2018 Lee ....................... H04B 1/715
10,749,970 B1 * 8/2020 Fisi ....................... H04W 12/06
10,880,356 B1 12/2020 Ichapurapu et al.
11,245,742 B2 * 2/2022 Poornachary ....... H04L 12/1877
11,427,222 B2 * 8/2022 Inudo .................... B60W 40/02
11,463,365 B1 * 10/2022 Vasseur ................ H04L 47/122
11,720,835 B2 * 8/2023 Matula ................ H04M 3/5175 705/7.14
11,792,709 B2 10/2023 Park et al.
2002/0077115 A1 * 6/2002 Ruutu ...................... G01S 5/10 455/457
2003/0003916 A1 * 1/2003 Foster ............... H04W 36/0033 455/442
2003/0217070 A1 * 11/2003 Gotoh .................. G01S 5/0018 707/999.102
2005/0013264 A1 * 1/2005 Sundberg .......... H04W 36/0038 370/328
2005/0071120 A1 * 3/2005 Hutchinson ............. E21B 44/00 702/150
2005/0075110 A1 * 4/2005 Posti ..................... H04L 1/0015 455/452.1
2005/0159872 A1 * 7/2005 Geborek ............. B60R 21/0132 340/440
2005/0185630 A1 * 8/2005 Aoki ...................... H04H 20/72 370/349
2007/0025296 A1 * 2/2007 Jung ................... H04W 36/322 370/331
2007/0165574 A1 * 7/2007 Srey ...................... H04W 36/02 370/331
2008/0040272 A1 * 2/2008 Eskin ................... G06Q 20/105 705/41
2009/0185478 A1 * 7/2009 Zhang ................... H04L 47/728 370/216
2010/0091648 A1 * 4/2010 Zhao ...................... H04L 45/16 370/392
2010/0226254 A1 * 9/2010 Kerr ................... G06Q 30/0206 370/238
2012/0063428 A1 * 3/2012 Ng .................... H04W 36/0016 370/338
2012/0106458 A1 * 5/2012 Jang ...................... H04W 76/18 370/328
2012/0311173 A1 * 12/2012 Agarwal ........... H04W 36/0079 709/231
2013/0044603 A1 * 2/2013 Macias ................. H04W 48/18 370/241
2013/0083663 A1 * 4/2013 Nishioka ........... H04W 28/0236 370/235
2013/0083772 A1 * 4/2013 Hata ..................... H04W 76/19 370/331
2013/0182681 A1 * 7/2013 Sane ..................... H04L 1/1867 370/331
2013/0188478 A1 * 7/2013 Kayser ................ H04L 41/0668 370/228
2015/0016815 A1 * 1/2015 Maggiari ............. H04B 10/032 398/5
2015/0039261 A1 * 2/2015 Kim ........................ G01P 15/00 702/141
2015/0229529 A1 * 8/2015 Engebretsen ........... H04L 67/10 709/223
2015/0309894 A1 * 10/2015 Zhou ................... G06F 11/1423 714/4.11
2016/0094462 A1 * 3/2016 Heitz .................... H04W 80/06 370/231
2016/0112941 A1 * 4/2016 Desai .................... H04L 12/145 370/329
2017/0006117 A1 * 1/2017 Kafle .................... H04L 65/612
2017/0134261 A1 * 5/2017 Seo ......................... H04L 45/24
2017/0156083 A1 * 6/2017 Finkenstadt .......... H04L 67/131
2017/0180486 A1 * 6/2017 Mehta ................ H04L 43/0852
2017/0214626 A1 * 7/2017 Dunlap ................. H04W 48/20
2018/0135989 A1 * 5/2018 Schreier ............... G01C 21/343
2018/0242110 A1 * 8/2018 Suzuki .................. H04W 4/024
2018/0338268 A1 * 11/2018 Lee ..................... H04L 47/2475
2018/0367443 A1 * 12/2018 Shi .......................... H04L 45/26
2019/0068312 A1 * 2/2019 Zhang ................... H04L 1/0033
2019/0132242 A1 * 5/2019 Gota ........................ H04L 45/22
2019/0221106 A1 * 7/2019 Wengrovitz ........ H04W 12/069
2019/0344997 A1 * 11/2019 Pahlke .................. B66B 1/3492
2020/0008248 A1 * 1/2020 Beck ....................... H04L 45/24
2020/0162376 A1 * 5/2020 Du ...................... H04W 40/246
2020/0178127 A1 * 6/2020 Ravichandran ....... H04W 68/00
2020/0196214 A1 * 6/2020 Martinez-Heath .... H04M 1/725
2020/0216288 A1 * 7/2020 Hattori ..................... H04Q 9/00
2020/0267618 A1 * 8/2020 Kye ...................... H04W 76/15
2020/0288360 A1 * 9/2020 Zheng ................... H04W 40/16
2020/0329399 A1 * 10/2020 Chung .................. H04L 69/322
2020/0351716 A1 * 11/2020 Zu ......................... H04L 5/0044
2020/0382983 A1 * 12/2020 Ma .......................... H04W 4/44
2020/0404518 A1 * 12/2020 Yuan ................. H04W 28/0236
2021/0125424 A1 * 4/2021 Ding ..................... G01S 13/505
2021/0219369 A1 * 7/2021 Zheng ................... H04W 48/12
2021/0227058 A1 * 7/2021 Martinez-Heath ........................... H04L 65/1066
2021/0235369 A1 * 7/2021 Koshy ................. H04W 64/003
2021/0266900 A1 * 8/2021 Chan ..................... H04W 36/06
2021/0336875 A1 * 10/2021 Baj ......................... H04L 45/22
2021/0352669 A1 * 11/2021 Lu ......................... H04W 72/23
2021/0374713 A1 * 12/2021 De Sa Costa ...... G06Q 20/3229
2022/0007260 A1 * 1/2022 Guo .................... H04W 36/324
2022/0029857 A1 * 1/2022 Ponnuru ............. H04L 12/4633
2022/0103611 A1 * 3/2022 Pollack ................. H04L 65/612
2022/0174669 A1 * 6/2022 Yang ................ H04W 72/0446
2022/0191682 A1 * 6/2022 Li ............................ H04W 8/205
2022/0210833 A1 * 6/2022 Drabek ............. H04W 74/0808
2022/0224629 A1 * 7/2022 Mada ...................... H04L 45/04
2022/0224720 A1 * 7/2022 Jiang ................... G06F 16/9566
2022/0261335 A1 * 8/2022 Gao ...................... H04W 12/06
2022/0284822 A1 9/2022 Mujumdar
2022/0329535 A1 * 10/2022 Li ....................... H04L 47/2441
2022/0363282 A1 * 11/2022 Ying ......................... G06F 3/14
2022/0394439 A1 * 12/2022 McRae ................. H04W 76/15
2022/0418025 A1 * 12/2022 Kim ...................... H04W 52/52
2023/0144074 A1 * 5/2023 Szilagyi ................ H04L 45/245 370/235
2023/0216780 A1 * 7/2023 Chen ....................... H04L 45/22 370/216
2023/0264101 A1 * 8/2023 Li ......................... A63F 13/358
2023/0276428 A1 * 8/2023 Aly ........................ H04B 1/713 370/252
2023/0403545 A1 * 12/2023 Patil ...................... H04W 8/005
2024/0062478 A1 * 2/2024 Kincart ................. G06T 19/006
2024/0089822 A1 * 3/2024 Wang .................... H04W 36/30
2024/0129812 A1 * 4/2024 Yang ..................... H04W 36/14
2025/0227139 A1 * 7/2025 Shribman ............... H04L 67/02

FOREIGN PATENT DOCUMENTS

| | | | |
|---|---|---|---|
| CN | 102811370 | A | 12/2012 |
| CN | 103828299 | A | 5/2014 |
| CN | 110072263 | A | 7/2019 |
| CN | 112217679 | A | 1/2021 |
| CN | 112738745 | A | 4/2021 |
| CN | 113037624 | A | 6/2021 |
| CN | 113810938 | A | 12/2021 |
| EP | 3767911 | A1 | 1/2021 |
| RU | 2310999 | C2 | 11/2007 |
| RU | 2646326 | C2 | 3/2018 |
| WO | 2010141460 | A1 | 12/2010 |
| WO | 2020022952 | A1 | 1/2020 |
| WO | 2020218759 | A1 | 10/2020 |
| WO | 2021019549 | A1 | 2/2021 |

* cited by examiner

Figure 9:
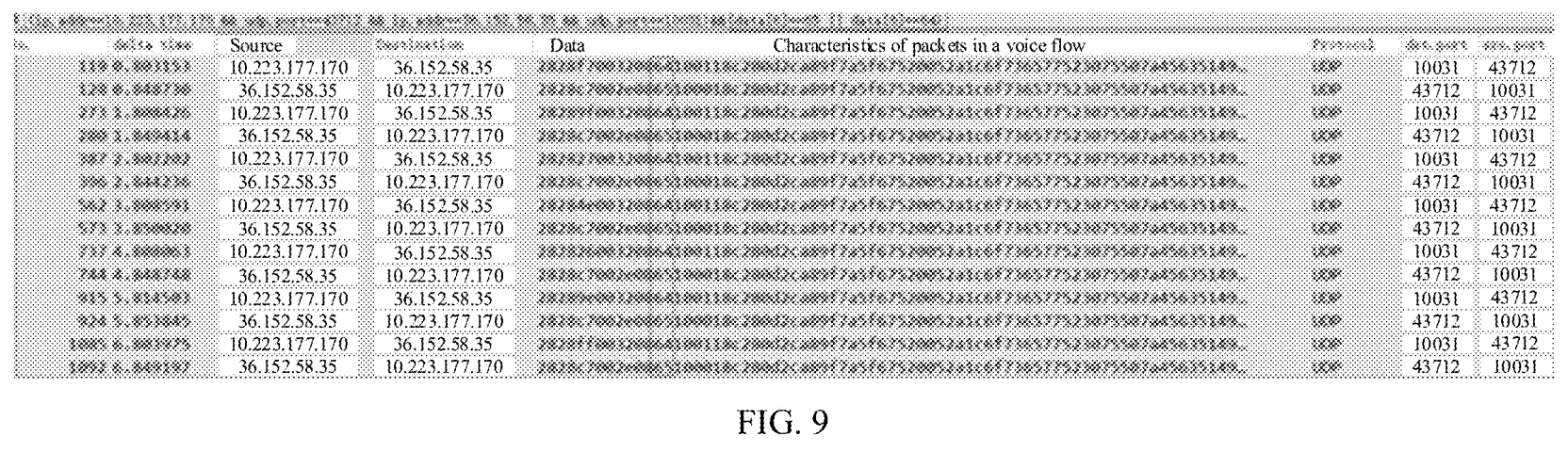

| [illegible] | [illegible] | Source | [illegible] | Data Characteristics of packets in a voice flow | [illegible] | [illegible] | [illegible] |
|---|---|---|---|---|---|---|---|
| [illegible] | [illegible] | 10.223.177.170 | 36.152.58.35 | [illegible] | [illegible] | 10031 | 43712 |
| [illegible] | [illegible] | 36.152.58.35 | 10.223.177.170 | [illegible] | [illegible] | 43712 | 10031 |
| [illegible] | [illegible] | 10.223.177.170 | 36.152.58.35 | [illegible] | [illegible] | 10031 | 43712 |
| [illegible] | [illegible] | 36.152.58.35 | 10.223.177.170 | [illegible] | [illegible] | 43712 | 10031 |
| [illegible] | [illegible] | 10.223.177.170 | 36.152.58.35 | [illegible] | [illegible] | 10031 | 43712 |
| [illegible] | [illegible] | 36.152.58.35 | 10.223.177.170 | [illegible] | [illegible] | 43712 | 10031 |
| [illegible] | [illegible] | 10.223.177.170 | 36.152.58.35 | [illegible] | [illegible] | 10031 | 43712 |
| [illegible] | [illegible] | 36.152.58.35 | 10.223.177.170 | [illegible] | [illegible] | 43712 | 10031 |
| [illegible] | [illegible] | 10.223.177.170 | 36.152.58.35 | [illegible] | [illegible] | 10031 | 43712 |
| [illegible] | [illegible] | 36.152.58.35 | 10.223.177.170 | [illegible] | [illegible] | 43712 | 10031 |
| [illegible] | [illegible] | 10.223.177.170 | 36.152.58.35 | [illegible] | [illegible] | 10031 | 43712 |
| [illegible] | [illegible] | 36.152.58.35 | 10.223.177.170 | [illegible] | [illegible] | 43712 | 10031 |
| [illegible] | [illegible] | 10.223.177.170 | 36.152.58.35 | [illegible] | [illegible] | 10031 | 43712 |
| [illegible] | [illegible] | 36.152.58.35 | 10.223.177.170 | [illegible] | [illegible] | 43712 | 10031 |

FIG. 9 ip.dst==192.168.43.186 && udp.dstport==43496 && ip.src==101.226.129.122 && udp.srcport==11988 && (data[0]==00) && (data[1]==01)

| No. | Time | delta time | Protocol | Source | Destination | src.port | dst.port | Info | Le Data |
|---|---|---|---|---|---|---|---|---|---|
| 5646 | 2021-04-30 09:32:07.024078 | 37.497885 | UDP | 101.226.129.122 | 192.168.43.186 | 11988 | 43496 | 11988 → 43496 Len=73 | ···0001000001000000000001003366000b000b40130100000000400 |
| 5663 | 2021-04-30 09:32:07.497369 | 37.971176 | UDP | 101.226.129.122 | 192.168.43.186 | 11988 | 43496 | 11988 → 43496 Len=73 | ···0001000002000000000001003366000b000b40130100000000600 |
| 5700 | 2021-04-30 09:32:08.370853 | 38.844660 | UDP | 101.226.129.122 | 192.168.43.186 | 11988 | 43496 | 11988 → 43496 Len=73 | ···0001000003000000000001003366000b000b40130100000000700 |
| 5718 | 2021-04-30 09:32:08.847579 | 39.321386 | UDP | 101.226.129.122 | 192.168.43.186 | 11988 | 43496 | 11988 → 43496 Len=73 | ···0001000004000000000001003366000b000b40130100000000800 |
| 5722 | 2021-04-30 09:32:09.383089 | 39.856896 | UDP | 101.226.129.122 | 192.168.43.186 | 11988 | 43496 | 11988 → 43496 Len=73 | ···0001000005000000000001003366000b000b40130100000000900 |
| 5725 | 2021-04-30 09:32:09.906050 | 40.379857 | UDP | 101.226.129.122 | 192.168.43.186 | 11988 | 43496 | 11988 → 43496 Len=73 | ···0001000006000000000001003366000b000b4013010000000a00 |
| 5727 | 2021-04-30 09:32:10.415159 | 40.888966 | UDP | 101.226.129.122 | 192.168.43.186 | 11988 | 43496 | 11988 → 43496 Len=73 | ···0001000007000000000001003366000b000b4013010000000b00 |
| 5740 | 2021-04-30 09:32:11.227562 | 41.701369 | UDP | 101.226.129.122 | 192.168.43.186 | 11988 | 43496 | 11988 → 43496 Len=73 | ···0001000008000000000001003366000b000b4013010000000d00 |
| 5752 | 2021-04-30 09:32:11.456430 | 41.930237 | UDP | 101.226.129.122 | 192.168.43.186 | 11988 | 43496 | 11988 → 43496 Len=73 | ···0001000009000000000001003366000b000b4013010000000f00 |
| 5768 | 2021-04-30 09:32:12.002613 | 42.476420 | UDP | 101.226.129.122 | 192.168.43.186 | 11988 | 43496 | 11988 → 43496 Len=73 | ···000100000a00000000001003366000b000b40130100000001400 |
| 5791 | 2021-04-30 09:32:12.502225 | 42.976032 | UDP | 101.226.129.122 | 192.168.43.186 | 11988 | 43496 | 11988 → 43496 Len=73 | ···000100000b00000000001003366000b000b40130100000001900 |
| 5814 | 2021-04-30 09:32:13.027414 | 43.501221 | UDP | 101.226.129.122 | 192.168.43.186 | 11988 | 43496 | 11988 → 43496 Len=73 | ···000100000c00000000001003366000b000b4013010000001c00 |
| 5830 | 2021-04-30 09:32:13.631323 | 44.105130 | UDP | 101.226.129.122 | 192.168.43.186 | 11988 | 43496 | 11988 → 43496 Len=73 | ···000100000d00000000001003366000b000b4013010000001f00 |
| 5848 | 2021-04-30 09:32:14.592458 | 45.066265 | UDP | 101.226.129.122 | 192.168.43.186 | 11988 | 43496 | 11988 → 43496 Len=73 | ···000100000e00000000001003366000b000b40130100000002000 |
| 5857 | 2021-04-30 09:32:15.128571 | 45.602378 | UDP | 101.226.129.122 | 192.168.43.186 | 11988 | 43496 | 11988 → 43496 Len=73 | ···000100000f00000000001003366000b000b40130100000002100 |
| 5869 | 2021-04-30 09:32:15.953207 | 46.427014 | UDP | 101.226.129.122 | 192.168.43.186 | 11988 | 43496 | 11988 → 43496 Len=73 | ···0001000010000000000001003366000b000b40130100000002200 |
| 5876 | 2021-04-30 09:32:16.653399 | 47.127206 | UDP | 101.226.129.122 | 192.168.43.186 | 11988 | 43496 | 11988 → 43496 Len=73 | ···0001000011000000000001003366000b000b40130100000002300 |
| 5898 | 2021-04-30 09:32:17.191883 | 47.665690 | UDP | 101.226.129.122 | 192.168.43.186 | 11988 | 43496 | 11988 → 43496 Len=73 | ···0001000012000000000001003366000b000b40130100000002400 |
| 5940 | 2021-04-30 09:32:17.713304 | 48.187111 | UDP | 101.226.129.122 | 192.168.43.186 | 11988 | 43496 | 11988 → 43496 Len=73 | ···0001000013000000000001003366000b000b40130100000002500 |
| 5983 | 2021-04-30 09:32:18.264306 | 48.738113 | UDP | 101.226.129.122 | 192.168.43.186 | 11988 | 43496 | 11988 → 43496 Len=73 | ···0001000014000000000001003366000b000b40130100000002600 |
| 6039 | 2021-04-30 09:32:18.767172 | 49.240979 | UDP | 101.226.129.122 | 192.168.43.186 | 11988 | 43496 | 11988 → 43496 Len=73 | ···0001000015000000000001003366000b000b40130100000002700 |
| 6111 | 2021-04-30 09:32:19.286859 | 49.760666 | UDP | 101.226.129.122 | 192.168.43.186 | 11988 | 43496 | 11988 → 43496 Len=73 | ···0001000016000000000001003366000b000b40130100000002800 |
| 6205 | 2021-04-30 09:32:19.828051 | 50.301858 | UDP | 101.226.129.122 | 192.168.43.186 | 11988 | 43496 | 11988 → 43496 Len=73 | ···0001000017000000000001003366000b000b40130100000002900 |

FIG. 11

CHANNEL SWITCHING METHOD, ELECTRONIC DEVICE, AND STORAGE MEDIUM

CROSS-REFERENCE TO RELATED APPLICATIONS

This application is a national stage of International Application No. PCT/CN2022/072713 filed on Jan. 19, 2022, which claims priority to Chinese Patent Application No. 202110729329.1 filed on Jun. 29, 2021. The disclosures of both of the aforementioned application are hereby incorporated by reference in their entireties.

TECHNICAL FIELD

Embodiments of this application relate to the field of communication technologies, and in particular, to a channel switching method, an electronic device, and a storage medium.

BACKGROUND

With rapid development of electronic technologies and Internet technologies, mobile devices such as mobile phones are more and more widely used in people's daily life. For example, mobile payment and gaming may be performed by using a mobile phone. To ensure normal running of a common service (for example, gaming, calling, or a social software service), a mobile phone of a user is usually connected to a wireless network. However, in some scenarios, a current wireless network cannot meet a service requirement (for example, a case in which a mobile phone signal deteriorates), which may cause a service to be stalled. In this case, the user may enable an acceleration channel to meet the service requirement. However, switching of the acceleration channel may result in a relatively high delay, and may also cause a service to be stalled, thereby reducing user experience.

SUMMARY

Embodiments of this application provide a channel switching method, an electronic device, and a storage medium, so as to provide a manner of switching from a primary network channel to a secondary network channel, so as to improve switching efficiency and improve user experience.

According to a first aspect, an embodiment of this application provides a channel switching method, where the method is applied to an electronic device, the electronic device has a plurality of network channels, a first application runs on the electronic device, the first application is carried on a first network channel, the first application includes a plurality of packet flows, and the method includes:

in response to a monitored scenario change, detecting a second network channel based on a service type of the first application, and determining a path of the second network channel based on a detection result, where the first application may be an Internet application such as gaming, music, or video; and obtaining packets of the first application on the first network channel; and determining a characteristic packet flow from a plurality of packet flows of the first application, collecting statistics on packets in the characteristic packet flow to obtain a first statistical result, and switching the characteristic packet flow to the second network channel based on the first statistical result.

In this embodiment of this application, because a scenario change may cause a service to be stalled, by detecting and storing a secondary network link in advance, after the service stalling is identified, the service is switched to the secondary network link to reduce a time interval between identification and switching, thereby improving channel switching efficiency.

In a possible implementation, the network channel includes at least a primary Wi-Fi channel, a secondary Wi-Fi channel, a primary cellular channel, and a secondary cellular channel.

In a possible implementation, the characteristic packet flow includes at least one of a download flow, a video flow, or a gaming flow.

In a possible implementation, the first application is an insensitive application, and the method further includes:

collecting statistics on packets of the characteristic packet flow of the first application to obtain a second statistical result, and determining quality of the first network channel based on the second statistical result;

detecting the second network channel based on the quality of the first network channel, and determining the path of the second network channel based on a detection result; and switching the characteristic packet flow to the second network channel.

In this embodiment of this application, because the insensitive application is insensitive to a switching moment, a path of a secondary network does not need to be pre-stored, and a better network channel in another network channel needs to be directly detected only after it is detected that quality of a network channel deteriorates, and a current application is directly switched to the better network channel, thereby improving switching flexibility.

In a possible implementation, the collecting statistics on packets of the characteristic packet flow of the first application to obtain a second statistical result includes: collecting statistics on the packets that are in the characteristic packet flow of the first application and that are received within preset first duration, to obtain the second statistical result.

In this embodiment of this application, sufficient packets may be obtained based on relatively long preset first duration, so that the quality of the current primary network channel may be accurately determined.

In a possible implementation, the foregoing first application is a sensitive type application.

In a possible implementation, the obtaining packets of the first application on the first network channel includes:

obtaining the packets of the first application on the first network channel within a preset second duration.

In this embodiment of this application, preset second duration that is relatively short or equal to the preset first duration may be set to quickly determine whether switching needs to be performed.

In a possible implementation, after the switching the characteristic packet flow to the second network channel based on the first statistical result, the method includes:

carrying a non-characteristic packet flow of the first application on the first network channel.

In this embodiment of this application, only the characteristic packet flow is switched, and a non-characteristic packet flow is still carried on the primary network channel, thereby improving switching efficiency.

In a possible implementation, after the switching the characteristic packet flow to the second network channel based on the first statistical result, the method includes: switching the non-characteristic packet flow in the first application to the second network channel, and disabling the first network channel.

In this embodiment of this application, all the packet flows of the first application are switched to the secondary network channel, thereby improving quality of all the packet flows and further improving user experience.

In a possible implementation, the method further includes:

deleting the path of the second network channel based on the first statistical result.

In this embodiment of this application, if it is found that the quality of the characteristic packet flow meets a requirement after statistics of the characteristic packet flow are collected, in this case, the path of the second network channel may be deleted, thereby saving resources and reducing power consumption of an electronic device.

In a possible implementation, the deleting the path of the second network channel based on the first statistical result includes:

deleting the path of the second network channel after preset fourth duration based on the first statistical result.

In this embodiment of this application, by setting the preset fourth duration, it may be ensured if the quality of the characteristic flow deteriorates, the characteristic flow can be switched to the secondary network channel in a timely manner within the preset fourth duration, so as to avoid that switching cannot be performed because the path of the secondary network channel is deleted.

In a possible implementation, the detecting a second network channel based on a service type of the first application, and determining a path of the second network channel based on a detection result includes:

detecting a round-trip delay of a packet of the second network channel based on the service type of the first application to obtain a detection result, where the detection result includes the round-trip delay of a packet of each network channel; and determining the path of the second network channel based on the detection result.

In this embodiment of this application, quality of the network channel can be quickly obtained by calculating a round-trip delay of the network channel.

In a possible implementation, the detection result further includes a historical record of each network channel.

In this embodiment of this application, by combining the round-trip delay and the historical record, the quality of the network channel may be more accurately obtained, so that a better secondary network channel may be more accurately selected.

In a possible implementation, the collecting statistics on packets in the characteristic packet flow to obtain a first statistical result includes:

collecting statistics on a delay or a packet loss rate of the packets in the characteristic packet flow to obtain the first statistical result, where the first statistical result is used to indicate whether the characteristic packet flow meets a preset delay requirement or a preset packet loss rate requirement.

In this embodiment of this application, by calculating the delay or the packet loss rate of the characteristic packet flow, quality of the characteristic packet flow can be quickly obtained, so that a switching decision can be quickly made.

In a possible implementation, the electronic device further includes an acceleration sensor, and a scenario is obtained through detection by the acceleration sensor.

In a possible implementation, the scenario is obtained by detecting movement of the electronic device in a vertical direction by the acceleration sensor.

According to a second aspect, an embodiment of this application provides an electronic device, including:

a memory, where the memory is configured to store computer program code, the computer program code includes an instruction, the electronic device has a plurality of network channels, a first application is run on the electronic device, the first application is carried on a first network channel, the first application includes a plurality of packet flows, and when the electronic device reads the instruction from the memory, the electronic device is enabled to perform the following steps:

in response to a monitored scenario change, detecting a second network channel based on a service type of the first application, and determining a path of the second network channel based on a detection result;

obtaining packets of the first application on the first network channel; and determining a characteristic packet flow from a plurality of packet flows of the first application, collecting statistics on packets in the characteristic packet flow to obtain a first statistical result, and switching the characteristic packet flow to the second network channel based on the first statistical result.

In a possible implementation, the network channel includes at least a primary Wi-Fi channel, a secondary Wi-Fi channel, a primary cellular channel, and a secondary cellular channel.

In a possible implementation, the characteristic packet flow includes at least one of a download flow, a video flow, or a gaming flow.

In a possible implementation, the first application is an insensitive application, and when the instruction is executed by the electronic device, the electronic device is enabled to further perform the following steps:

collecting statistics on packets of the characteristic packet flow of the first application to obtain a second statistical result, and determining quality of the first network channel based on the second statistical result;

detecting the second network channel based on the quality of the first network channel, and determining the path of the second network channel based on a detection result; and switching the characteristic packet flow to the second network channel.

In a possible implementation, when the instruction is executed by the electronic device, that the electronic device is enabled to perform the step of collecting statistics on packets of the characteristic packet flow of the first application to obtain a second statistical result includes:

collecting statistics on the packets that are in the characteristic packet flow of the first application and that are received within preset first duration, to obtain the second statistical result.

In a possible implementation, the foregoing first application is a sensitive type application.

In a possible implementation, when the instruction is executed by the electronic device, that the electronic device is enabled to perform the step of obtaining packets of the first application on the first network channel includes:

obtaining the packets of the first application on the first network channel within a preset second duration.

In a possible implementation, when the instruction is executed by the electronic device, after the electronic device is enabled to perform the step of switching the characteristic packet flow to the second network channel based on the first statistical result, the following step is further performed:

carrying a non-characteristic packet flow of the first application on the first network channel.

In a possible implementation, when the instruction is executed by the electronic device, after the electronic device is enabled to perform the step of switching the characteristic packet flow to the second network channel based on the first statistical result, the following step is further performed:

switching the non-characteristic packet flow in the first application to the second network channel, and disabling the first network channel.

In a possible implementation, when the instruction is executed by the electronic device, that the electronic device is enabled to further perform the following step:

deleting the path of the second network channel based on the first statistical result.

In a possible implementation, when the instruction is executed by the electronic device, that the electronic device is enabled to perform the step of deleting the path of the second network channel based on the first statistical result includes:

deleting the path of the second network channel after preset fourth duration based on the first statistical result.

In a possible implementation, when the instruction is executed by the electronic device, that the electronic device is enabled to perform the step of detecting the second network channel based on the quality of the first network channel, and determining the path of the second network channel based on a detection result includes:

detecting a round-trip delay of a packet of the second network channel based on the service type of the first application to obtain a detection result, where the detection result includes the round-trip delay of a packet of each network channel; and determining the path of the second network channel based on the detection result.

In a possible implementation, the detection result further includes a historical record of each network channel.

In a possible implementation, when the instruction is executed by the electronic device, that the electronic device is enabled to perform the step of collecting statistics on packets in the characteristic packet flow to obtain a first statistical result includes:

collecting statistics on a delay or a packet loss rate of the packets in the characteristic packet flow to obtain the first statistical result, where the first statistical result is used to indicate whether the characteristic packet flow meets a preset delay requirement or a preset packet loss rate requirement.

In a possible implementation, the electronic device further includes an acceleration sensor, and a scenario is obtained through detection by the acceleration sensor.

In a possible implementation, the scenario is obtained by detecting movement of the electronic device in a vertical direction by the acceleration sensor.

According to a third aspect, an embodiment of this application provides a computer readable storage medium, where the computer readable storage medium stores a computer program, and when the computer program is run on a computer, the computer is enabled to perform the method according to the first aspect.

According to a fourth aspect, an embodiment of this application provides a computer program, where when the computer program is executed by a computer, the computer program is used to perform the method according to the first aspect.

In a possible design, the program in the fourth aspect may be completely or partially stored in a storage medium that is packaged with the processor, or may be partially or completely stored in a memory that is not packaged with the processor.

BRIEF DESCRIPTION OF DRAWINGS

FIG. 9 is a schematic diagram of a structure of a heartbeat packet in a voice flow according to an embodiment of this application;

FIG. 11 is a schematic diagram of a packet in a battle flow according to an embodiment of this application.

DESCRIPTION OF EMBODIMENTS

Figure 1:
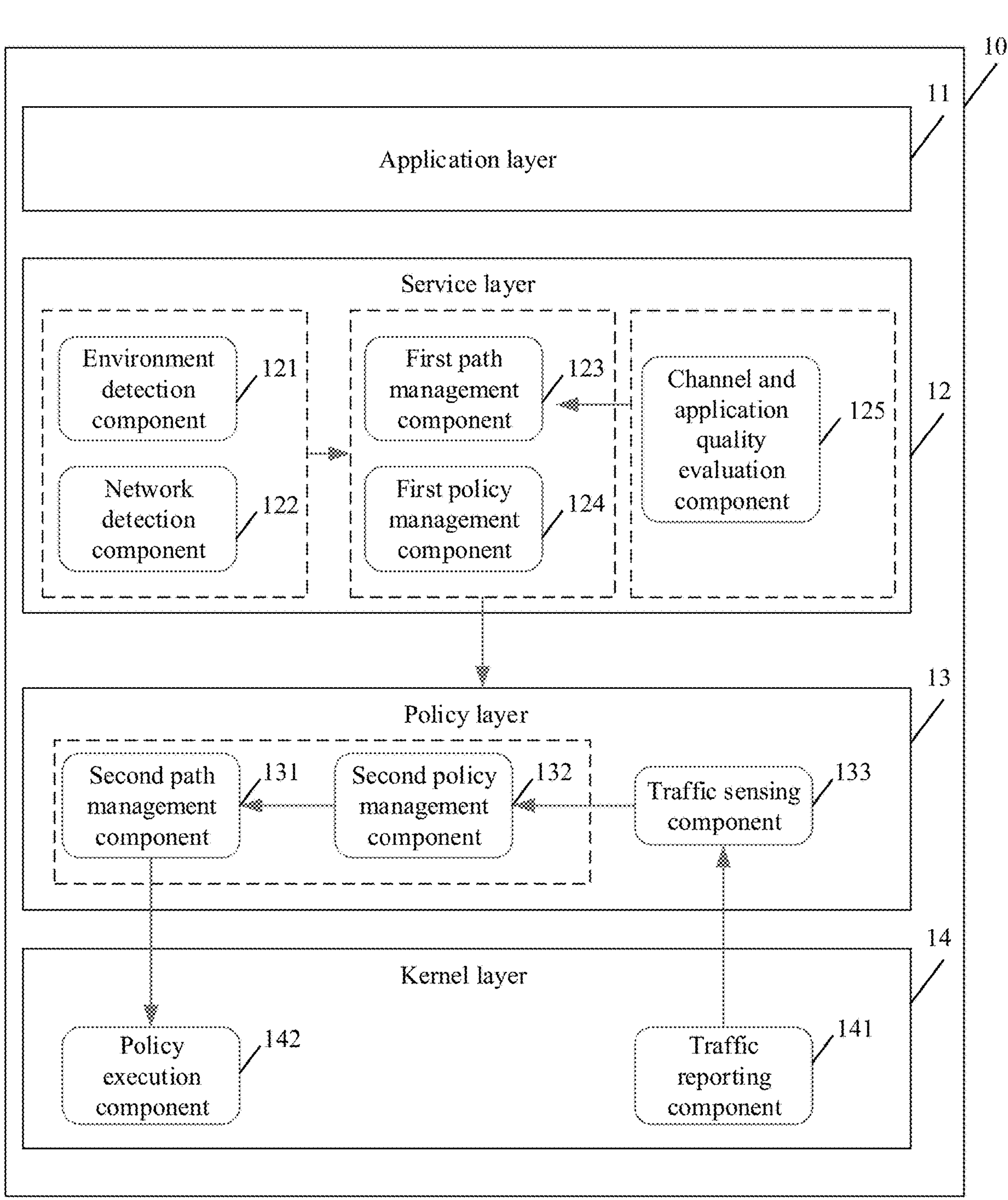
FIG. 1 is a schematic diagram of a software architecture of an electronic device according to an embodiment of this application.

The following describes technical solutions in embodiments of this application with reference to accompanying drawings in the embodiments of this application. In the descriptions of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

The terms "first" and "second" are used herein for description only, and cannot be understood as indicating or implying relative importance or implicitly indicating the quantity of indicated technical features. Therefore, the features defined with "first" and "second" can explicitly or implicitly include one or more of the features. In the description of the embodiments of this application, unless otherwise specified, "a plurality of" means two or more.

With rapid development of electronic technologies and Internet technologies, mobile devices such as mobile phones are more and more widely used in people's daily life. For example, mobile payment and gaming may be performed by using a mobile phone. To ensure normal running of a common service (for example, gaming, calling, or a social software service), a mobile phone of a user is usually connected to a wireless network. However, in some scenarios, a current wireless network cannot meet a service requirement (for example, a case in which a mobile phone signal deteriorates), which may cause a service to be stalled. In this case, the user may enable an acceleration channel to meet the service requirement. However, switching of the acceleration channel may result in a relatively high delay, and may also cause a service to be stalled, thereby reducing user experience.

To resolve the foregoing problem, an embodiment of this application provides a channel switching method, and the channel switching method is applied to a first device 10. The first device 10 may also be a mobile terminal, a terminal device, user equipment (User Equipment, UE), an access terminal, a subscriber unit, a subscriber station, a mobile station, a mobile console, a remote station, a remote terminal, a mobile device, a user terminal, a terminal, a wireless communication device, a user agent, or a user apparatus. The first device 10 may be a station (Station, ST) in a WLAN, or may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA) device, a handheld device with a wireless communication function, a computing device or another processing device connected to a wireless modem, a vehicle-mounted device, an Internet of Vehicles terminal, a computer, a laptop computer, a handheld communication device, a handheld computing device, a satellite wireless device, a wireless modem card, a set top box (Set Top Box, STB), a customer premise equipment (Customer Premise Equipment, CPE), and/or another device configured to perform communication in a wireless system, a mobile terminal in a next generation communication system (for example, a 5G network) or a future evolved Public Land Mobile Network (Public Land Mobile Network, PLMN), or the like. The first device 10 may alternatively be a wearable device. A wearable device may also be referred to as a wearable smart device, and is a general term for daily wearable devices that are smartly designed and developed by using wearable technologies, such as glasses, gloves, watches, apparels, and shoes. A wearable device is a portable device that can be worn directly on the body or integrated into the clothing or accessories of a user. The wearable device is not merely a hardware device, it can implement a powerful function based on software support, and data interaction, and cloud interaction. Generalized wearable smart devices include large-sized smart devices that can implement some functions without relying on a smartphone, such as smartwatches or smart glasses, and also include smart devices that focus on a particular application function and need to work with another device such as a smartphone, such as smart bands and smart jewelry that are used for sign monitoring.

It can be understood that the foregoing scenario in which the first device 10 is used to play an online game is merely an example for description, and does not constitute a limitation on the embodiments of this application. In some embodiments, scenarios in which the first device is used to listen to online music, watch a video, and the like may be further included.

Next, a system framework diagram of the first device 10 is described with reference to FIG. 1. As shown in FIG. 1, the first device 10 includes an application layer 11, a service layer 12, a policy layer 13, and a kernel layer 14.

The application layer 11 may be used to provide various network applications. The foregoing network applications may be third-party applications, or may be system applications, for example, network applications such as gaming, music, and video. This application imposes no special limitation on a type of a network application provided by the application layer 11.

The service layer 12 may include an environment detection component 121, a network detection component 122, a first path management component 123, a first policy management component 124, and a channel and application quality evaluation component 125. The environment detection component 121 may be configured to detect a state of an application. For example, the state of the application may include a state such as application exit, application enabling, application running, application installation, and application uninstallation. It can be understood that the foregoing state is merely an example for description, and may further include more states. Details are not described herein again. The network detection component 122 may be configured to detect an enabling state of a network channel. The first path management component 123 may be configured to request/disable a network channel (for example, a primary Wi-Fi channel, a secondary Wi-Fi channel, a primary cellular channel, and a secondary cellular channel), sense a status change of the network channel, update a network channel selection policy, and may be further configured to store paths of a plurality of network channels. The first policy management component 124 may generate different execution policies based on input information. For example, the policy may be enabling an acceleration function of the network channel, or may be enabling traffic sensing (for example, detecting traffic of the network channel). The channel and application quality evaluation component 125 may be configured to evaluate quality of the network channel.

The policy layer 13 may include a second path management component 131, a second policy management component 132, and a traffic sensing component 133. The second path management component 131 may be configured to update a selection of a network channel according to a policy change of an upper layer, trigger network channel quality detection, and dynamically select an optimal channel, and may be further configured to store paths of different network channels, for example, may store a path of a primary network channel and a path of a secondary network channel. The second policy management component 132 may be configured to indicate switching of a network channel. The traffic sensing component 133 may be configured to collect statistics of reported traffic.

The kernel layer 14 may include a traffic reporting component 141 and a policy execution component 142. The traffic reporting component 141 may be configured to collect and report traffic information. The policy execution component 142 may be configured to perform network channel switching.

Figure 2:
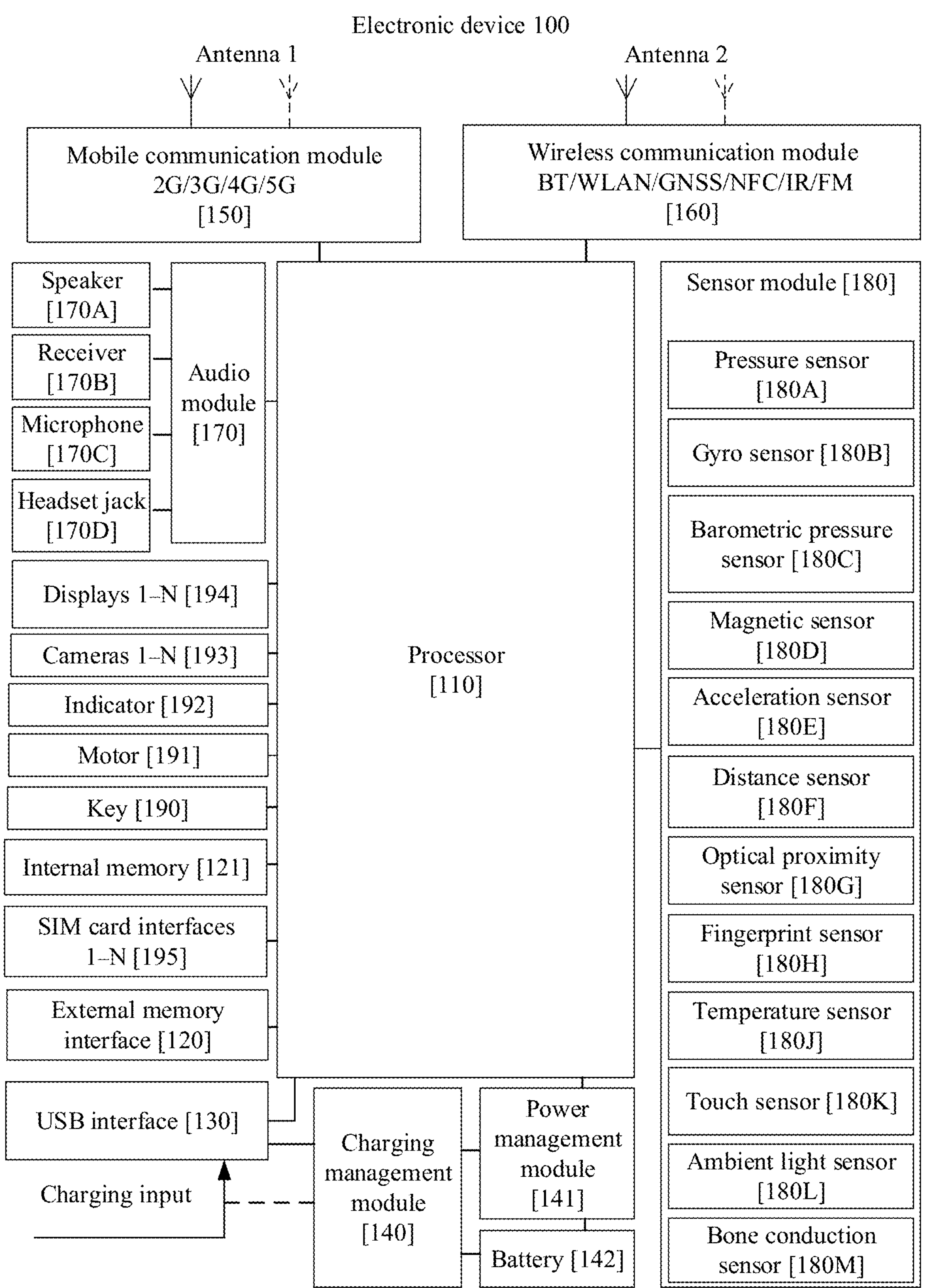
FIG. 2 is a schematic diagram of a hardware structure of an electronic device according to an embodiment of this application.

With reference to FIG. 2, the following first describes an example electronic device provided in the following embodiment of this application. FIG. 2 is a schematic diagram of a structure of an electronic device 100. The electronic device 100 may be the foregoing first device 10.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in the embodiments of the present invention does not constitute a specific limitation on the electronic device 100. In some other embodiments of this application, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on an instruction operation code and a time sequence signal, so as to control instruction retrieval and instruction execution.

A memory may be further disposed in the processor 110 to store an instruction and data. In some embodiments, the memory in the processor 110 is a cache memory. The memory can store an instruction or data that the processor 110 has just used or used cyclically. If the processor 110 needs to use the instruction or data again, the instruction or data can be directly invoked from the memory. Repeated access is avoided, and a waiting time of the processor 110 is reduced, thereby improving system efficiency.

In some embodiments, the processor 110 may include one or more interfaces. The interface may be an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI) interface, a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, and includes a serial data line (serial data line, SDA) and a serial clock line (serial clock line, SCL). In some embodiments, the processor 110 may include a plurality of groups of I2C buses. The processor 110 may be coupled to the touch sensor 180K, a charger, a flash, the camera 193 and the like by using different I2C bus interfaces. For example, the processor 110 may be coupled to the touch sensor 180K by using an I2C interface, so that the processor 110 communicates with the touch sensor 180K by using the I2C bus interface, thereby implementing a touch function of the electronic device 100.

The I2S interface can be used for audio communication. In some embodiments, the processor 110 may include a plurality of groups of I2S buses. The processor 110 may be coupled to the audio module 170 by using the I2S bus to implement communication between the processor 110 and the audio module 170. In some embodiments, the audio module 170 can transmit an audio signal to the wireless communication module 160 by using the I2S interface, so as to implement a function of answering calls by using a Bluetooth headset.

The PCM interface can also be used for audio communication to sample, quantize and encode analog signals. In some embodiments, the audio module 170 may be coupled to the wireless communication module 160 by using a PCM bus interface. In some embodiments, the audio module 170 can also transmit an audio signal to the wireless communication module 160 by using the PCM interface, so as to implement a function of answering calls by using a Bluetooth headset. Both the I2S interface and the PCM interface can be used for audio communication.

The UART interface is a universal serial data bus used for asynchronous communication. The bus may be a bidirectional communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 by using the UART interface to implement a Bluetooth function. In some embodiments, the audio module 170 can transmit an audio signal to the wireless communication module 160 by using the UART interface, so as to implement a function of playing music by using a Bluetooth headset.

The MIPI interface may be configured to connect the processor 110 to the display 194, the camera 193 and other peripheral devices. The MIPI interface includes a camera serial interface (camera serial interface, CSI), a display serial interface (display serial interface, DSI), and the like. In some embodiments, the processor 110 and the camera 193 communicate by using the CSI to implement a photographing function of the electronic device 100. The processor 110 and the display 194 communicate by using the DSI to implement a display function of the electronic device 100.

The GPIO interface may be configured by using software. The GPIO interface may be configured as a control signal interface, or may be configured as a data signal interface. In some embodiments, the GPIO interface may be configured to connect the processor 110 to the camera 193, the display 194, the wireless communication module 160, the audio module 170, the sensor module 180, and the like. The GPIO interface may be alternatively configured as an I2C interface, an I2S interface, a UART interface, an MIPI interface, or the like.

The USB interface 130 is an interface that complies with USB standard specifications, and may be specifically a Mini USB interface, a Micro USB interface, a USB Type C interface, or the like. The USB interface 130 may be configured to connect to the charger to charge the electronic device 100, or may be configured to transmit data between the electronic device 100 and peripheral devices. The USB interface 130 may be further configured to connect a headset and play audio by using the headset. The interface may be further configured to connect to another electronic device, such as an AR device.

It can be understood that the interface connection relationship between the modules illustrated in the embodiments of the present invention is merely an example for description, and does not constitute a limitation on the structure of the electronic device 100. In some other embodiments of this application, the electronic device 100 may alternatively use an interface connection mode that is different from those in the foregoing embodiments, or use a combination of a plurality of interface connection modes.

The charging management module 140 is configured to receive a charging input from a charger. The charger may be a wireless charger, or may be a wired charger. In some wired charging embodiments, the charging management module 140 may receive a charging input of the wired charger by using the USB interface 130. In some embodiments of wireless charging, the charging management module 140 can receive a wireless charging input by using a wireless charging coil of the electronic device 100. When charging the battery 142, the charging management module 140 can further supply power to the electronic device by using the power management module 141.

The power management module 141 is configured to connect the battery 142, the charging management module 140, and the processor 110. The power management module 141 receives an input from the battery 142 and/or an input from the charging management module 140, and supplies power to the processor 110, the internal memory 121, the display 194, the camera 193, the wireless communication module 160, and the like. The power management module 141 may be further configured to monitor parameters such as a battery capacity, a quantity of battery cycles, and a battery health status (leakage or impedance). In some other embodiments, the power management module 141 may alternatively be disposed in the processor 110. In some other embodiments, the power management module 141 and the charging management module 140 may alternatively be disposed in the same device.

The wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may further be multiplexed to improve antenna utilization. For example, the antenna 1 may be multiplexed into a diversity antenna of a wireless local area network. In some other embodiments, the antenna may be used in combination with a tuning switch.

The mobile communication module 150 can provide a wireless communication solution that is applied to the electronic device 100, including 2G/3G/4G/5G and the like. The mobile communication module 150 may include at least one filter, a switch, a power amplifier, a low noise amplifier (low noise amplifier, LNA), and the like. The mobile communication module 150 can receive an electromagnetic wave by using the antenna 1, perform processing such as filtering and amplification on the received electromagnetic wave, and transmit the processed electromagnetic wave to the modem processor for demodulation. The mobile communication module 150 can further amplify a signal that is modulated by the modem processor, and the signal is converted into an electromagnetic wave and radiated by the antenna 1. In some embodiments, at least some functional modules of the mobile communication module 150 may be disposed in the processor 110. In some embodiments, at least some functional modules of the mobile communication module 150 and at least some modules of the processor 110 may be disposed in the same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. The demodulator then transmits the demodulated low-frequency baseband signal to a baseband processor for processing. After being processed by the baseband processor, the low-frequency baseband signal is transmitted to the application processor. The application processor outputs a sound signal by using an audio device (not limited to the speaker 170A, the receiver 170B, and the like), or displays an image or video by using the display 194. In some embodiments, the modem processor may be an independent device. In some other embodiments, the modem processor may be independent of the processor 110 and be disposed in the same device as the mobile communication module 150 or another functional module.

The wireless communication module 160 may provide a wireless communication solution that is applied to the electronic device 100, including wireless local area network (wireless local area network, WLAN) (such as a wireless fidelity (wireless fidelity, Wi-Fi) network), Bluetooth (Bluetooth, BT), global navigation satellite system (global navigation satellite system, GNSS), frequency modulation (frequency modulation, FM), near field communication (near field communication, NFC), infrared (infrared, IR), and the like. The wireless communication module 160 may be one or more devices integrating at least one communication processing module. The wireless communication module 160 receives an electromagnetic wave by using the antenna 2, performs processing such as frequency modulation and filtering on the electromagnetic wave signal, and sends the processed signal to the processor 110. The wireless communication module 160 can further receive a to-be-sent signal from the processor 110, and perform frequency modulation and amplification on the signal, and the signal is converted into an electromagnetic wave and radiated by the antenna 2.

In some embodiments, the antenna 1 of the electronic device 100 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is an image processing microprocessor, which is connected to the display 194 and the application processor. The GPU is configured to perform mathematical and geometric calculations to render graphics. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light emitting diode (organic light-emitting diode, OLED), an active matrix organic light emitting diode (active-matrix organic light emitting diode, AMOLED), a flex light emitting diode (flex light-emitting diode, FLED), a Miniled, a MicroLed, a Micro-oLed, quantum dot light emitting diodes (quantum dot light emitting diodes, QLED), or the like. In some embodiments, the electronic device 100 may include 1 or N displays 194, and N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is opened, light is transmitted to a photosensitive element of the camera through a lens, an optical signal is converted into an electrical signal, and the photosensitive element of the camera transfers the electrical signal to the ISP for processing, so that the electrical signal is converted into an image visible to a naked eye. The ISP can further optimize algorithms for noise, brightness, and a skin color of the image. The ISP can further optimize parameters such as exposure and color temperature in a photographing scenario. In some embodiments, the ISP may be disposed in the camera 193.

The camera 193 is configured to capture a still image or a video. An optical image is generated for an object through the lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP. The ISP converts the electrical signal into a digital image signal. The ISP outputs the digital image signal to the DSP for processing. The DSP converts the digital image signal into an image signal in a standard format of RGB, YUV, or the like. In some embodiments, the electronic device 100 may include 1 or N cameras 193, and N is a positive integer greater than 1.

The digital signal processor is configured to process a digital signal. In addition to processing a digital image signal, the digital signal processor can further process another digital signal. For example, when the electronic device 100 selects a frequency, the digital signal processor is configured to perform Fourier transform or the like on energy of the frequency.

The video codec is configured to compress or decompress a digital video. The electronic device 100 can support one or more video codecs. In this way, the electronic device 100 may play or record videos in a plurality of encoding formats, such as moving picture experts group (moving picture experts group, MPEG) 1, MPEG 2, MPEG3, and MPEG4.

The NPU is a neural-network (neural-network, NN) computing processor. By referring to a structure of a biological neural network, such as a transfer mode between human brain neurons, the NPU quickly processes input information, and can further perform continuous self-learning. Applications such as intelligent cognition of the electronic device 100 may be implemented by using the NPU, such as image recognition, face recognition, voice recognition, and text understanding.

The external memory interface 120 may be configured to connect to an external memory card such as a Micro SD card, so as to expand a storage capacity of the electronic device 100. The external memory card communicates with the processor 110 by using the external storage interface 120, so as to implement a data storage function. For example, music, video, and other files are stored in the external memory card.

The internal memory 121 may be configured to store computer executable program code, where the executable program code includes an instruction. The internal memory 121 may include a program storage area and a data storage area. The program storage area may store an operating system, an application program required by at least one function (for example, a sound play function or an image play function), or the like. The data storage area may store data (such as audio data or a phone book) created during use of the electronic device 100. In addition, the internal memory 121 may include a high-speed random access memory, and may further include a non-volatile memory, such as at least one magnetic disk storage device, a flash memory device, or a universal flash storage (universal flash storage, UFS). By running the instruction stored in the internal memory 121, and/or the instruction stored in the memory disposed in the processor, the processor 110 executes various function applications and data processing of the electronic device 100.

The electronic device 100 can implement audio functions (such as music playing and sound recording) by using the audio module 170, the speaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to encode and decode audio signals. In some embodiments, the audio module 170 may be disposed in the processor 110, or some of the functional modules of the audio module 170 may be disposed in the processor 110.

The speaker 170A is configured to convert an audio electrical signal into a sound signal. The electronic device 100 can listen to music by using the speaker 170A, or listen to a hands-free call.

The receiver 170B is configured to convert an audio electrical signal into a sound signal. When the electronic device 100 receives a call or voice message, the receiver 170B can be placed close to an ear to receive the voice.

The microphone 170C, also referred to as a "loudspeaker", is configured to convert a sound signal into an electrical signal. When making a call or sending a voice message, the user can make the mouth approach the microphone 170C and emit a sound, so as to input a sound signal to the microphone 170C. The electronic device 100 may be provided with at least one microphone 170C. In some other embodiments, the electronic device 100 may be provided with two microphones 170C, which can implement noise reduction function in addition to collecting sound signals. In some other embodiments, the electronic device 100 may alternatively be provided with three, four, or more microphones 170C to implement sound signal collection, noise reduction, sound source recognition, directional recording, and the like functions.

The headset jack 170D is configured to connect a wired headset. The headset jack 170D may be a USB interface 130, or may be a 3.5 mm open electronic device platform (open mobile terminal platform, OMTP) standard interface, or a cellular telecommunication industry association of the USA (cellular telecommunication industry association of the USA, CTIA) standard interface.

The pressure sensor 180A is configured to sense a pressure signal and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates with conductive material. When a force is applied to the pressure sensor 180A, capacitance between electrodes changes. The electronic device 100 determines intensity of the pressure based on the change in capacitance. When a touch operation is applied to the display 194, the electronic device 100 detects intensity of the touch operation based on the pressure sensor 180A. The electronic device 100 can further calculate a touch position based on the detection signal of the pressure sensor 180A. In some embodiments, touch operations that are applied to the same touch position but have different touch operation intensity may be corresponding to different operation instructions. For example, when a touch operation whose touch operation intensity is less than a first pressure threshold is applied to a short message application icon, an instruction for viewing a short message is executed. When a touch operation whose touch operation intensity is greater than or equal to the first pressure threshold is applied to the short message application icon, an instruction for creating a short message is executed.

The gyro sensor 180B may be configured to determine a movement posture of the electronic device 100. In some embodiments, the gyro sensor 180B may be configured to determine angular velocities of the electronic device 100 around three axes (that is, x, y, and z axes). The gyro sensor 180B can be used for image stabilization. For example, when the shutter is pressed, the gyro sensor 180B detects a shake angle of the electronic device 100, calculates a distance that a lens module needs to compensate based on the angle, and allows the lens to counteract the shake of the electronic device 100 through reverse movement to implement image stabilization. The gyro sensor 180B can further be used in navigation and somatosensory gaming scenarios.

The barometric pressure sensor 180C is configured to measure barometric pressure. In some embodiments, the electronic device 100 calculates the altitude by using a barometric pressure value measured by the barometric pressure sensor 180C, to assist in positioning and navigation.

The magnetic sensor 180D includes a Hall sensor. The electronic device 100 can use the magnetic sensor 180D to detect the opening and closing of a flip holster. In some embodiments, when the electronic device 100 is a flip phone, the electronic device 100 can detect the opening and closing of a flip based on the magnetic sensor 180D, so as to set features such as automatic unlocking of the flip based on the detected opening and closing state of the holster or the opening and closing state of the flip.

The acceleration sensor 180E can detect magnitudes of acceleration of the electronic device 100 in various directions (generally three axes). When the electronic device 100 is still, a value and a direction of gravity may be detected. The acceleration sensor 180E may be further configured to identify the posture of the electronic device, and be used in applications such as switching between a landscape screen and a portrait screen, and a pedometer.

The distance sensor 180F is configured to measure a distance. The electronic device 100 can measure the distance by using infrared or laser. In some embodiments, in a photographing scenario, the electronic device 100 can use the distance sensor 180F to measure a distance to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light outward by using the light-emitting diode. The electronic device 100 uses the photodiode to detect infrared reflected light from a nearby object. When sufficient reflected light is detected, it can be determined that there is an object near the electronic device 100. When insufficient reflected light is detected, the electronic device 100 can determine that there is no object near the electronic device 100. The electronic device 100 can use the optical proximity sensor 180G to detect that the user holds the electronic device 100 close to the ear, so as to automatically turn off the screen to save power. The optical proximity sensor 180G may alternatively be used in a holster mode or a pocket mode to automatically unlock or lock the screen.

The ambient light sensor 180L is configured to sense brightness of ambient light. The electronic device 100 can adaptively adjust brightness of the display 194 based on the sensed brightness of the ambient light. The ambient light sensor 180L may be further configured to automatically adjust white balance during photographing. The ambient light sensor 180L can further cooperate with the optical proximity sensor 180G to detect whether the electronic device 100 is in a pocket, so as to prevent accidental touch.

The fingerprint sensor 180H is configured to collect a fingerprint. The electronic device 100 can use the collected fingerprint characteristics to implement fingerprint-based unlocking, application lock accessing, fingerprint-based photographing, fingerprint-based incoming call receiving, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 degrades performance of a processor located near the temperature sensor 180J, so as to reduce power consumption and implement thermal protection. In some other embodiments, when the temperature is lower than another threshold, the electronic device 100 heats the battery 142 to avoid abnormal shutdown of the electronic device 100 caused by low temperature. In some other embodiments, when the temperature is lower than still another threshold, the electronic device 100 boosts an output voltage of the battery 142 to avoid abnormal shutdown caused by low temperature.

The touch sensor 180K is also referred to as a "touch device". The touch sensor 180K may be disposed on the display 194, and the touch sensor 180K and the display 194 form a touchscreen, which is also referred to as a "touch-controlled screen". The touch sensor 180K is configured to detect a touch operation performed on or near the touch sensor 180K. The touch sensor can transmit a detected touch operation to the application processor to determine a type of a touch event. The display 194 may be configured to provide a visual output related to the touch operation. In some other embodiments, the touch sensor 180K may alternatively be disposed on a surface of the electronic device 100, which is different from the position of the display 194.

The bone conduction sensor 180M can obtain a vibration signal. In some embodiments, the bone conduction sensor 180M can obtain a vibration signal obtained from bone mass vibration by a human voice part. The bone conduction sensor 180M can be further in contact with the human pulse to receive a blood pressure and pulse signal. In some embodiments, the bone conduction sensor 180M may alternatively be disposed a headset to be combined into a bone conduction headset. The audio module 170 can obtain a speech signal through parsing based on the vibration signal that is obtained by the bone conduction sensor 180M from bone mass vibration by the voice part, to implement a speech function. The application processor can parse heart rate information based on the blood pressure and pulse signal obtained by the bone conduction sensor 180M, to implement a heart rate detection function.

The key 190 includes a power-on key, a volume key, or the like. The key 190 may be a mechanical key, or may be a touch key. The electronic device 100 can receive a key input, and generate a key signal input related to user setting and function control of the electronic device 100.

The motor 191 can generate a vibration prompt. The motor 191 may be configured to provide an incoming call vibration prompt, or may be configured to provide a touch vibration feedback. For example, touch operations that act on different applications (such as photographing and audio playback) may be corresponding to different vibration feedback effects. In response to touch operations that act on different areas of the display 194, the motor 191 may also be corresponding to different vibration feedback effects. Different application scenarios (such as time reminding, receiving information, alarm clock, and gaming) may also be corresponding to different vibration feedback effects. Touch vibration feedback effects can also support customization.

The indicator 192 may be an indicator light, which may be configured to indicate a charging state and a power change, or to indicate a message, a missed call, a notification, or the like.

The SIM card interface 195 is configured to connect to an SIM card. An SIM card can be inserted into the SIM card interface 195 or pulled out from the SIM card interface 195 to implement contact with or separation from the electronic device 100. The electronic device 100 can support 1 or N SIM card interfaces, where N is a positive integer greater than 1. The SIM card interface 195 can support a Nano SIM card, a Micro SIM card, an SIM card, and the like. The same SIM card interface 195 allows a plurality of cards to be inserted simultaneously. The plurality of cards may be of the same type or different types. The SIM card interface 195 can also be compatible with different types of SIM cards. The SIM card interface 195 can also be compatible with an external memory card. The electronic device 100 interacts with the network by using the SIM card to implement functions such as call and data communication. In some embodiments, the electronic device 100 uses an eSIM, that is, an embedded SIM card. The eSIM card can be embedded in the electronic device 100 and cannot be separated from the electronic device 100.

Figure 3:
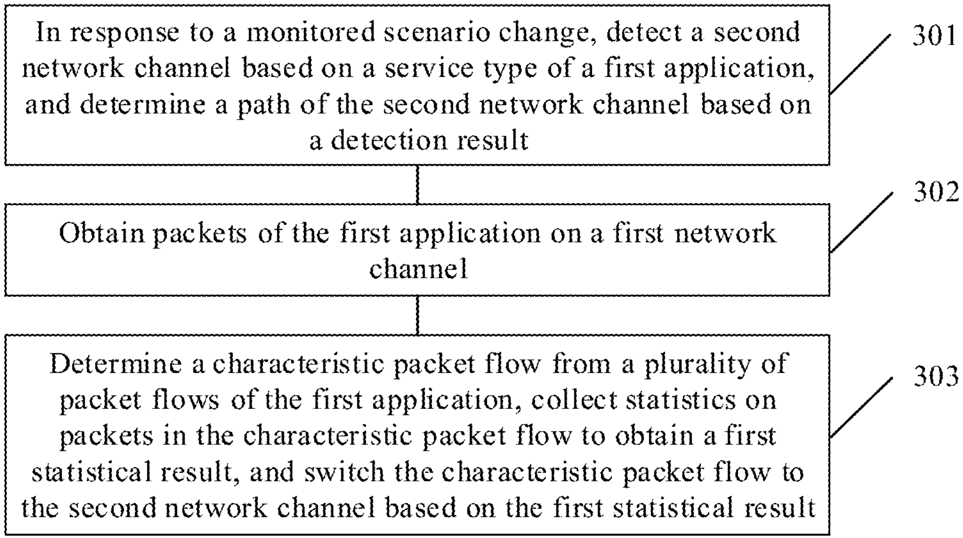
FIG. 3 is a schematic flowchart of a channel switching method according to an embodiment of this application.

FIG. 3 is a schematic flowchart of an embodiment of a channel switching method according to an embodiment of this application, where the method is applied to an electronic device 10, the electronic device 10 has a plurality of network channels, a first application runs on the electronic device 10, the first application is carried on a first network channel, the first application includes a plurality of packet flows, and the method includes:

Step 301: In response to a monitored scenario, detect a second network channel based on a service type of the first application, and determine a path of a second network channel based on a detection result.

Specifically, the foregoing scenario may be an environment in which the first device 10 is located. For example, the first device 10 is in an environment (for example, an elevator) in which a network is relatively poor. When the first device 10 detects the environment in which the first device 10 is located, in response to the foregoing monitored scenario, the first device 10 may initiate a detection request of the second network channel, so that a secondary network channel (that is, the second network channel) may be pre-stored.

Step 302: Obtain packets of the first application on the first network channel.

Specifically, by detecting the second network channel, the first device 10 may obtain network information of the second network channel, where the network information may include a path of the second network channel. It can be understood that the second network channel is an available network channel, so that the first device 10 may immediately switch to the second network channel when detecting that the first network channel does not meet a service requirement, thereby reducing a switching delay.

After the path of the second network channel is stored, a packet flow of the first application may be further detected.

Step 303: Determine a characteristic packet flow from a plurality of packet flows of the first application, collect statistics on packets in the characteristic packet flow to obtain a first statistical result, and switch the characteristic packet flow to the second network channel based on the first statistical result.

Specifically, the first device 10 may detect a packet flow of the first application in real time, and may identify the characteristic packet flow in a plurality of packet flows. Then, statistical analysis may be performed on the packets in a characteristic packet flow to obtain the first statistical result, where the first statistical result may be used to indicate whether quality of the characteristic packet flow deteriorates, that is, whether switching needs to be performed.

After determining that the characteristic packet flow needs to be switched, the first device 10 may switch the characteristic packet flow to the second network channel.

Figure 4:
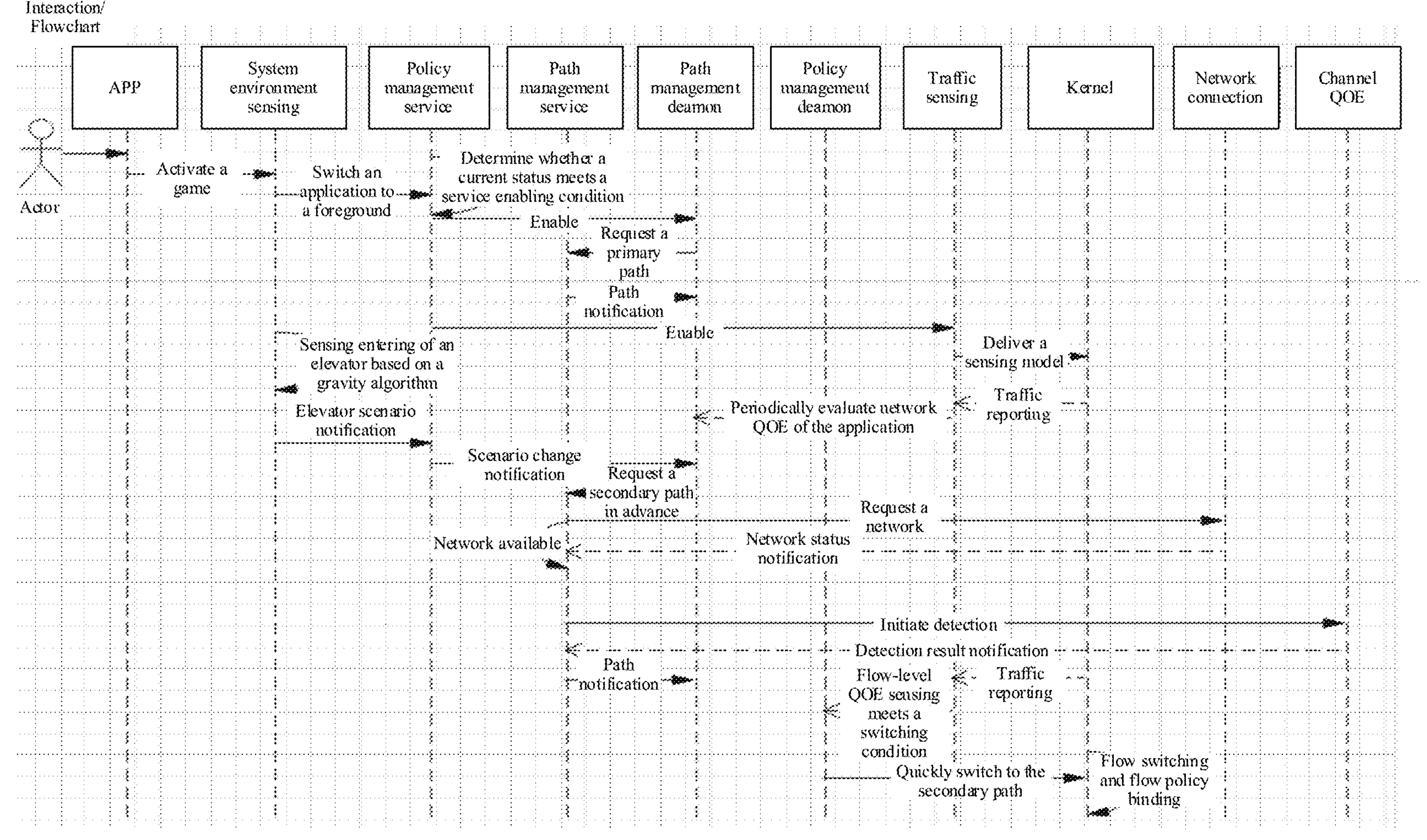
FIG. 4 is a schematic flowchart of a channel switching method according to another embodiment of this application.

Next, an example of the foregoing channel switching method is described by using FIG. 4. FIG. 4 is a schematic flowchart of another embodiment of a channel switching method according to an embodiment of this application, including:

Step 401: Enable a network application in response to an operation of a user.

Specifically, the user may perform an enabling operation in the electronic device 100, so as to enable a network application. For example, the user may tap an icon of the network application in the electronic device 100. In response to the operation of the user, the application layer 11 in the electronic device 100 enables the network application. It can be understood that the foregoing example shows only an example of a scenario in which a network application is enabled through tapping, which does not constitute a limitation on this embodiment of this application. In some embodiments, the network application may also be enabled by performing another operation (for example, double-tap, or slide). The foregoing network application may be a network application such as an online game, an online video, or online music.

Figure 5A:
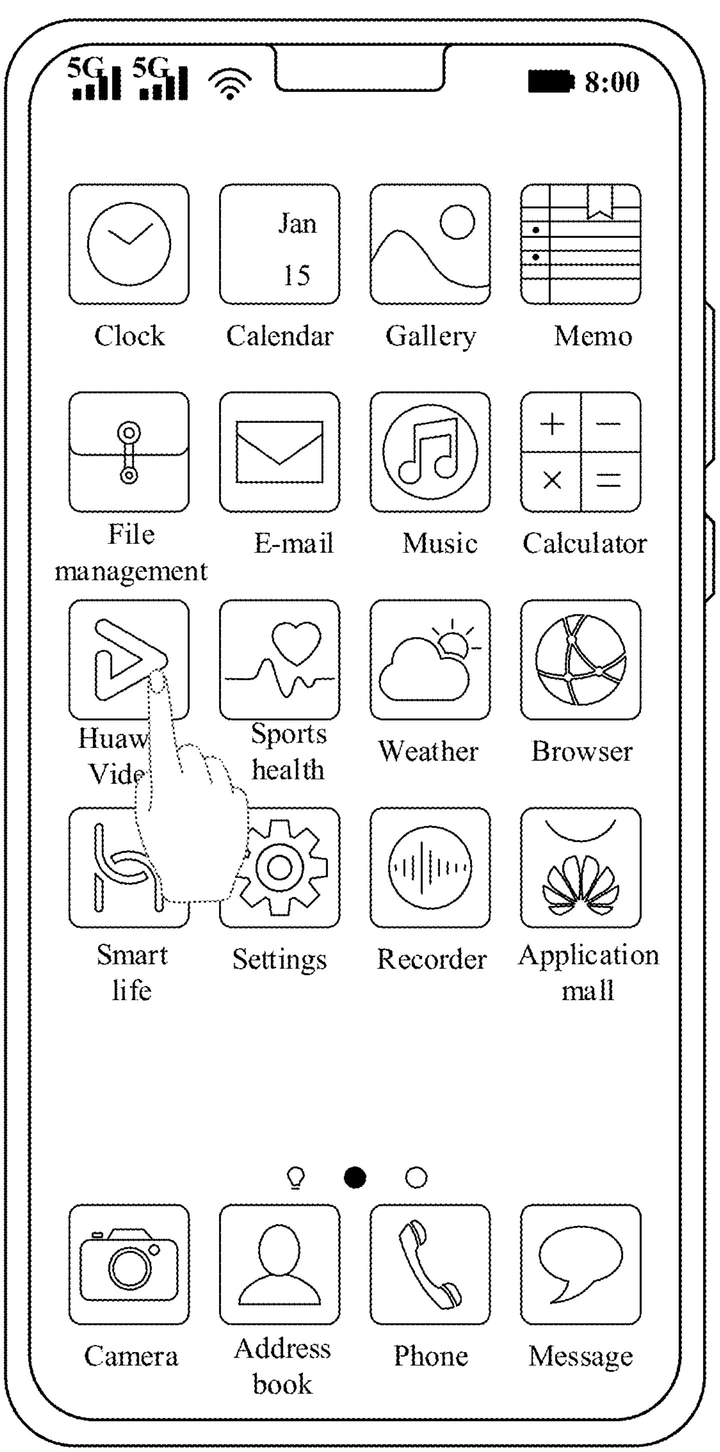
FIG. 5*a* is a schematic diagram of desktop display of a mobile phone according to an embodiment of this application.
Figure 5B:
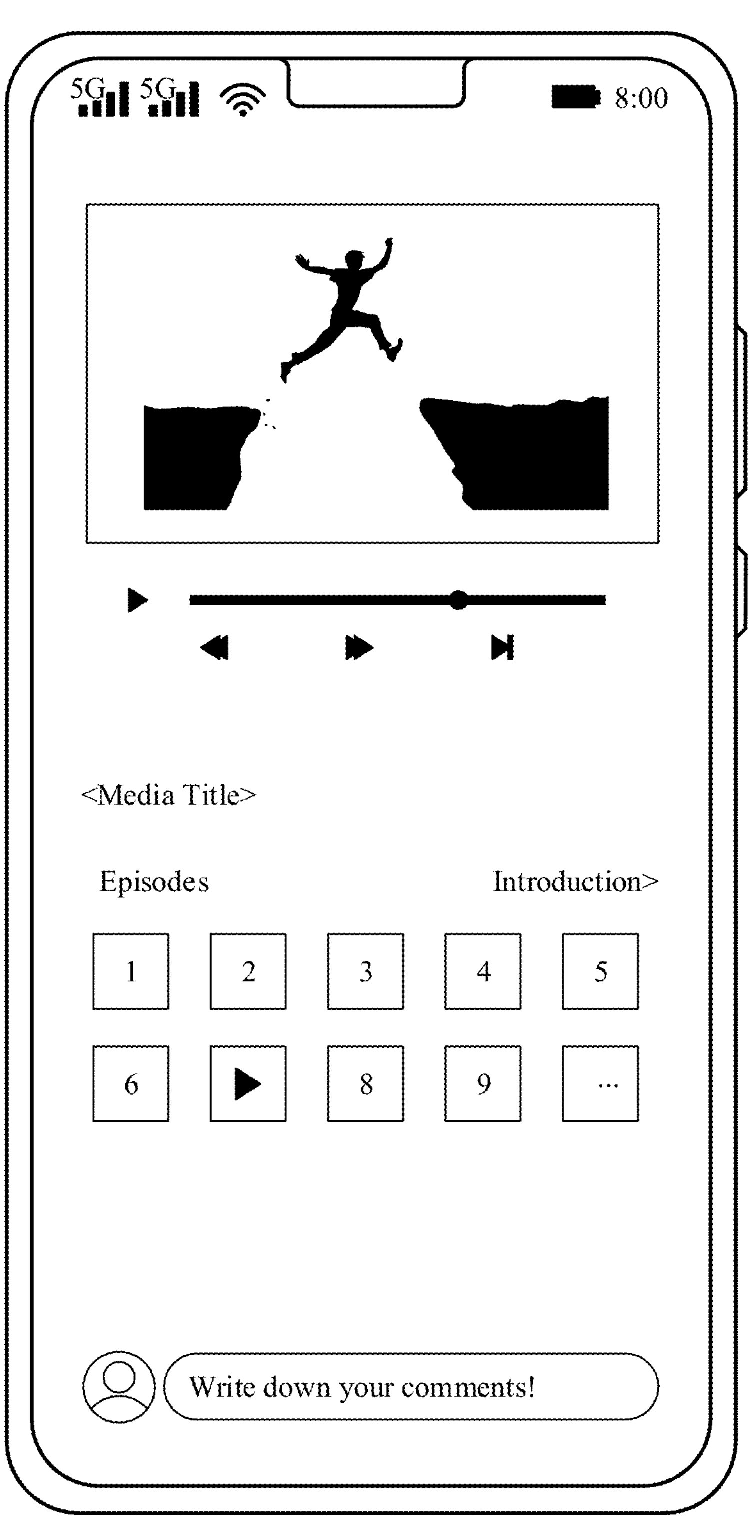
FIG. 5 is a schematic diagram of an application interface according to an embodiment of this application.

FIG. 5*a* is a schematic diagram of a desktop of a mobile phone. As shown in FIG. 5*a*, the user may tap an icon of a video application on the desktop of the mobile phone to enable a video application. Therefore, a schematic diagram of video display shown in FIG. 5*b* may be obtained.

Step 402: The environment detection component 121 detects that the network application is switched to a foreground or a network changes, and notifies the first policy management component 124.

Specifically, the environment detection component 121 at the service layer 120 in the electronic device 100 may continuously detect a status of the foregoing network application or the foregoing network environment. After detecting that any network application is switched to the foreground or the network environment changes, the environment detection component 121 may send a first notification message to the first policy management component 124, where the first notification message may be used to notify the first policy management component 124 that the network application is switched to the foreground or the network environment changes. It can be understood that the foregoing first notification message may further include an identity of the network application (for example, the identity of the network application may be a UID), and the identity may be used to uniquely identify the network application.

For example, the identity of the network application may be implemented by using the following code:

```
kuid_t sock_i_uid(struct sock *sk)
{       kuid_t uid
        read_lock_bh(&sk->sk_callback_lock);
        uid=sk->sk_socket?SOCK_INODE(sk->sk_socket)->i_uid:
GLOBAL_ROOT_UID;
        read_unlock_bh(&sk->sk_callback_lock);
        return uid;
}
EXPORT_SYMBOL(sock_i_uid).
```

Step 403: The first policy management component 124 receives the first notification message sent by the environment detection component 121, and determines whether the current network application meets a condition for enabling acceleration.

Specifically, after receiving the first notification message sent by the environment detection component 121, the first policy management component 124 may determine, based on the first notification message, that the network application is switched to the foreground. Then, the first policy management component 124 may further determine whether the network application is included in a preset application whitelist.

During specific implementation, an application whitelist may be preset in the first policy management component 124. The application whitelist may include a plurality of network applications, and each network application may be identified by using the foregoing identity. The application whitelist may be used to represent network applications for which acceleration may be enabled. The network application in the preset application whitelist may include a service type. For example, the network application in the preset application whitelist may be of a sensitive service, and the sensitive service may include a delay-sensitive service, a packet loss rate-sensitive service, and the like. When the identity of the network application in the first notification message is compared with identities of network applications in the preset application whitelist, it may be determined whether the network application in the first notification message is included in the preset application whitelist. If the network application in the first notification message is included in the preset application whitelist, it may be determined that the network application meets an acceleration enabling condition; or if the network application in the first notification message is not included in the preset application whitelist, it may be determined that the network application does not meet the acceleration enabling condition.

For example, Table 1 is a network application whitelist.

TABLE 1

| Application name | Type of characteristic flow | Channel quality parameter |
|---|---|---|
| Baidu Network Disk | Download flow | Rate |
| WeChat | Video flow | Delay/packet loss |
| Gaming | Battle flow | Delay/packet loss |

It can be understood that if the current network application is not in the preset application whitelist, that is, the service type of the current network application is an insensitive service, when detecting that a primary network channel deteriorates, the electronic device 100 may further detect another network channel with better quality, and then the insensitive service may be directly switched to the network channel with better quality.

Step 404: The first policy management component 124 sends a channel enable message to the second path management component 131, so as to enable a network channel.

Specifically, if the first policy management component 124 determines that the current network application meets the acceleration enabling condition, the first policy management component 124 may send the channel enable message to the second path management component 131, where the channel enable message is used to indicate the second path management component 131 to enable the network channel (for example, a primary network channel).

Step 405: The second path management component 131 requests a path of the primary network channel from the first path management component 123.

Specifically, after receiving the channel enable message sent by the first policy management component 124, the second path management component 131 may send a primary network channel request to the first path management component 123, where the primary network channel request is used to request a path of the primary network channel. For example, the primary network channel may be a primary Wi-Fi channel.

Step 406: The first path management component 123 sends the path of the primary network channel to the second path management component 131.

Specifically, the first path management component 123 may preconfigure paths of a plurality of network channels. For example, the plurality of network channels may include a primary Wi-Fi channel, a secondary Wi-Fi channel, a primary cellular channel, and a secondary cellular channel. The primary Wi-Fi channel and the secondary Wi-Fi channel may operate on a 2.4 GHz band or a 5 GHz band. For example, if the primary Wi-Fi channel operates on the 2.4 GHz band, the secondary Wi-Fi channel operates on the 5 GHz band; or if the primary Wi-Fi channel operates on the 5 GHz frequency band, the secondary Wi-Fi channel operates on the 2.4 GHz frequency band. In addition, the primary cellular channel and the secondary cellular channel may be corresponding to an operator network. For example, the primary cellular channel may use a SIM card 1 (the SIM card 1 belongs to a network of an operator A), and the secondary cellular channel may use a SIM card 2 (the SIM card 2 belongs to a network of an operator B). Generally, a priority of a primary Wi-Fi channel is higher than priorities of other three channels. Therefore, the primary network channel is usually the primary Wi-Fi channel. It can be understood that the foregoing preset channels are merely an example for description, which does not constitute a limitation on the embodiments of this application. In some embodiments, more channels may be included. In addition, using the primary Wi-Fi channel as the primary network channel is only a preferred solution, which does not constitute a limitation on this embodiment of this application. In some embodiments, another network channel may also be selected as the primary network channel.

After receiving the primary network channel request sent by the second path management component 131, the first path management component 123 may select one network channel from the plurality of network channels as the primary network channel (for example, the primary network channel is the primary Wi-Fi channel), and send the path of the primary network channel to the second path management component 131.

Step 407: The second path management component 131 stores the received path of the primary network channel.

Specifically, after receiving the path of the primary network channel that is sent by the first path management component 123, the second path management component 131 may store the path of the primary network channel. For example, the path of the primary network channel may be represented by "Wi-FiT".

Figure 6:
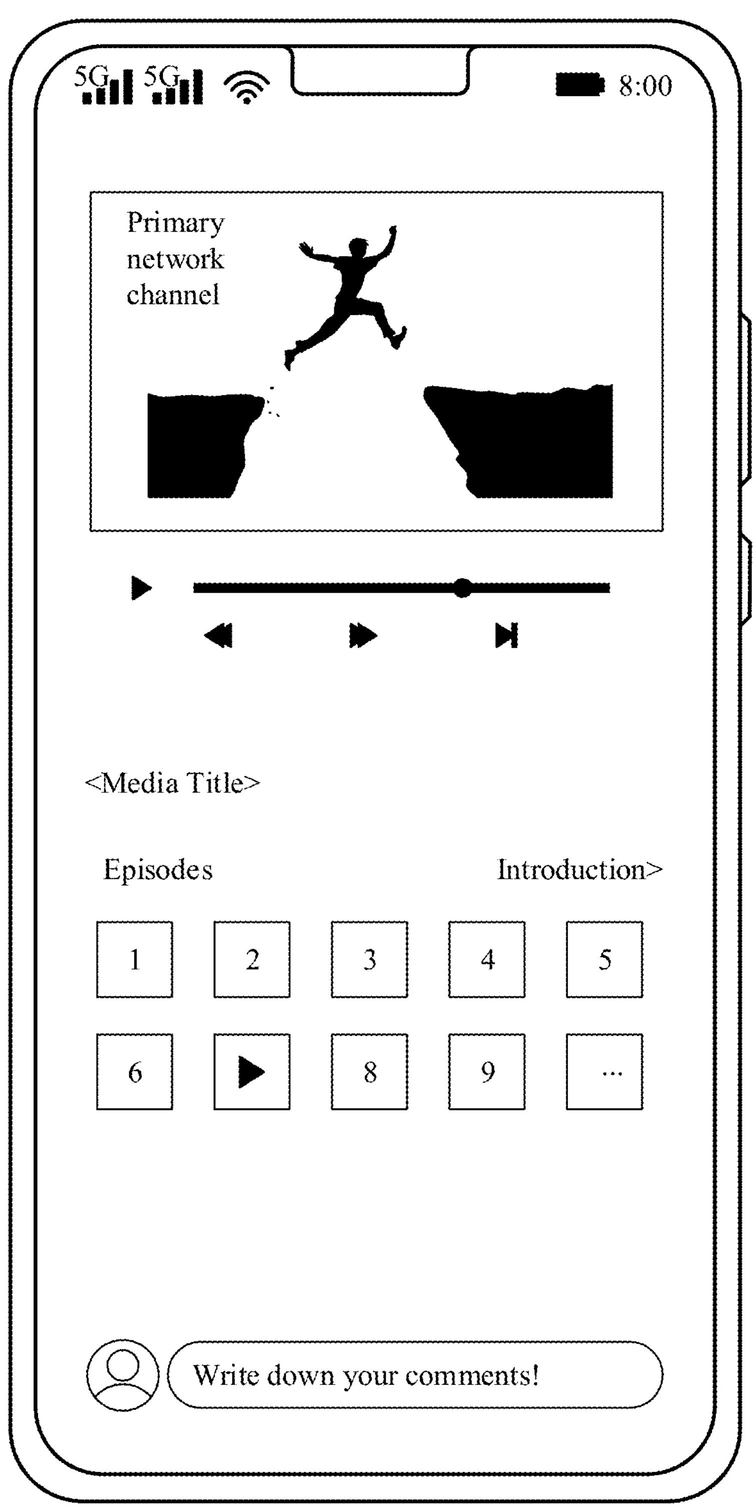
FIG. 6 is a schematic diagram of an application interface for using a primary network channel by a mobile phone according to an embodiment of this application.

FIG. 6 is a schematic diagram of an effect of using the primary network channel by a mobile phone. As shown in FIG. 6, after the mobile phone obtains the path of the primary network channel, the primary network channel may be used to watch a video.

It can be understood that a current network application (for example, a video application in FIG. 6) may include a plurality of flows (for example, a video flow and an audio flow), and the plurality of flows may be carried on the foregoing primary network channel.

Step 408: The first policy management component 124 sends a traffic detection request to the traffic sensing component 133.

Specifically, the traffic detection request may be used to indicate the traffic sensing component 133 to collect statistics on packets of a network application on the primary network channel. The traffic detection request may include an identity (for example, UID) of a current to-be-detected network application, which is used to request to detect a flow of a network application corresponding to the identity UID on the primary network channel. It can be understood that the flow of the foregoing network application may be in a form of a packet.

It should be noted that step 408 may be performed at the same time as step 404, or may be performed at any moment after step 404. This is not specifically limited in this application.

Step 409: The traffic sensing component 133 sends a traffic reporting request to the traffic reporting component 141.

Specifically, after receiving the traffic detection request sent by the first policy management component 124, the traffic sensing component 133 may send the traffic reporting request to the traffic reporting component 141, where the traffic reporting request may be used to indicate the traffic reporting component 141 to detect packets of the network application on the current primary network channel, and report the detected packets. It can be understood that the foregoing traffic detection request may include an identity (for example, UID) of the network application.

Step 410: The traffic reporting component 141 performs traffic detection, and reports the detected packets to the traffic sensing component 133.

Specifically, after receiving the traffic reporting request sent by the traffic sensing component 133, the traffic reporting component 141 may detect, based on the identity (for example, UID) of the network application in the traffic reporting request, the packets of the network application corresponding to the identity of the network application, so as to obtain the packets of the network application on the primary network channel, and may report the detected packets of the network application to the traffic sensing component 133.

During specific implementation, the traffic reporting component 141 may invoke a component (for example, a Netfilter component of an Android system) to obtain the packets of the network application on the primary network channel. It can be understood that the foregoing Netfilter component is merely an example for description, which does not constitute a limitation on the embodiments of this application. In some embodiments, the foregoing packet detection may also be completed by using another component.

For example, the foregoing network channel parameters may be implemented by using the following code:

```
typedef struct{
bool available;
bool slowDevForbbiden;
uint64_t qoeBadTimeStamp;
uint64_t chQoeBadStartTime;
uint32_t rcvRate;
}
```

It can be understood that the detected packets may be packets in one or more characteristic flows in the current network application, and the characteristic flow may be a flow with highest sensitivity in the network application, that is, a flow that has a relatively great impact on the current network application. In addition, the quantity of the network channel can be evaluated by using the foregoing network channel parameters.

Step 411: The environment detection component 121 detects a scenario in which the electronic device 100 is located.

Specifically, the scenario may be a scenario in which the user is located, that is, a scenario in which the electronic device 100 is located. For example, the scenario may be that the user is in an elevator. It can be understood that the elevator scenario is merely an example for description, and the scenario may further include another scenario that causes a network change, for example, a scenario such as a high-speed railway or a garage. Now, the elevator scenario is used as an example for description. When the user enters the elevator, the elevator goes up or goes down, which may cause a gravity change of the user. For example, when the elevator goes up, overweight is caused; or when the elevator goes down, weightlessness caused. Therefore, the acceleration sensor in the electronic device 100 may be used to detect the overweight and weightlessness. When the acceleration sensor detects that the user is in a weightlessness or overweight state, that is, an acceleration of the electronic device 100 in a vertical direction is detected, it may be determined that the user is in an elevator environment. In this case, if the environment detection component 121 detects that the user is in an elevator, the environment detection component 121 may send a scenario change notification message to the first policy management component 124, where the scenario change notification message is used to notify the first policy management component 124 that the scenario in which the user is located changes (for example, the user enters the elevator), so that the first policy management component 124 can initiate detection of the secondary network channel.

In addition, when the elevator goes up or goes down, the elevator may stop according to the needs of different users (for example, different users can click on different floors). Therefore, the elevator may continue to run or stop in a vertical direction. Because the electronic device 100 does not detect movement in a horizontal direction when the elevator goes up or goes down, it may still be determined that the electronic device 100 is in an elevator, where the movement in the horizontal direction may be detected by using the acceleration sensor in the electronic device 100. For example, if an acceleration in the horizontal direction is detected by using the foregoing acceleration sensor, the movement in the horizontal direction may be determined.

When the electronic device 100 detects that the electronic device 100 has an acceleration in the horizontal direction, that is, when the electronic device 100 moves horizontally, it may be determined that the user is out of the elevator, that is, the electronic device 100 is out of the elevator. In this case, detection of the secondary network channel may not be performed in advance, and therefore, the scenario change notification message does not need to be sent to the first policy management component 124, thereby saving power consumption of the electronic device 100 caused by detection of the secondary network channel.

Optionally, the electronic device 100 may also determine, by detecting signal strength of a mobile network, whether the scenario in which the user is located changes. For example, when signal strength of a mobile network is weak, it may be determined that the user enters a relatively poor network environment. In this case, the electronic device 100 can determine that the scenario has changed, and may send the scenario change notification message to the first policy management component 124, so as to detect the secondary network channel in advance. When the signal strength of the mobile network becomes higher, it may be determined that the user enters a relatively good network environment. In this case, detection of the secondary network channel may not be performed in advance, and the scenario change notification message may not be sent to the first policy management component 124, thereby saving power consumption of the electronic device 100 caused by detection of the secondary network channel.

Step 412: The environment detection component 121 sends the scenario change notification message to the first policy management component 124.

Specifically, after detecting the scenario change, the environment detection component 121 may send the scenario change notification message to the first policy management component 124.

Step 413: The first policy management component 124 forwards the scenario change notification message indicating the scenario change to the second path management component 131.

Step 414: The second path management component 131 requests the secondary network channel from the first path management component 123.

Specifically, because a signal is generally poor in an elevator, if channel selection and switching are performed after the user enters the elevator, a relatively high delay of a service may be caused, which may result in poor user experience. Therefore, when detecting that the user enters the elevator, a secondary network channel may be preselected. Therefore, channel switching can be accelerated, and a service delay caused by channel switching is reduced.

After receiving the scenario change notification message sent by the first policy management component 124, the second path management component 131 may send a secondary network channel request to the first path management component 123, where the secondary network channel request may be used to request a secondary network channel.

Optionally, the foregoing secondary network channel request may further carry a label, and the label may be used to indicate that switching of the primary network channel is predicted rather than being actually performed.

Figure 7A:
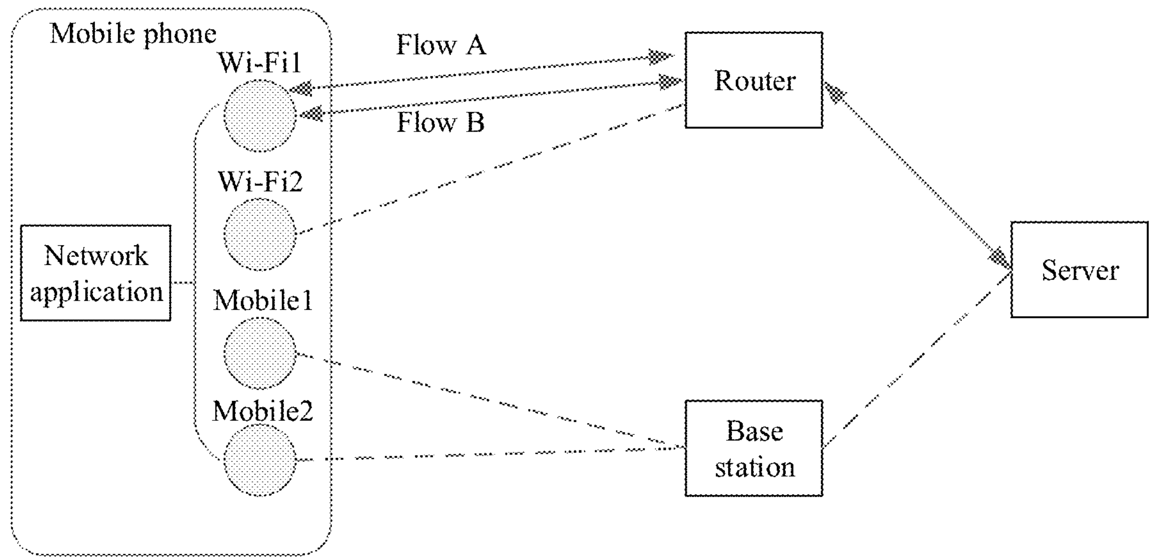
FIG. 7*a* to FIG. 7*c* are a schematic diagram of flow switching according to an embodiment of this application.
Figure 7B:
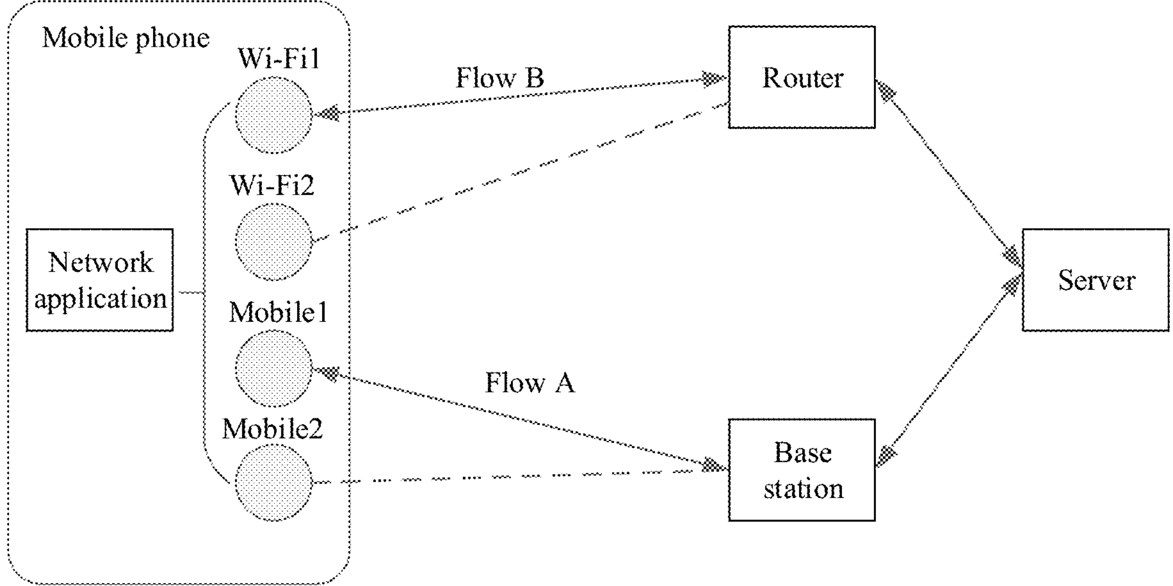
Figure 7C:
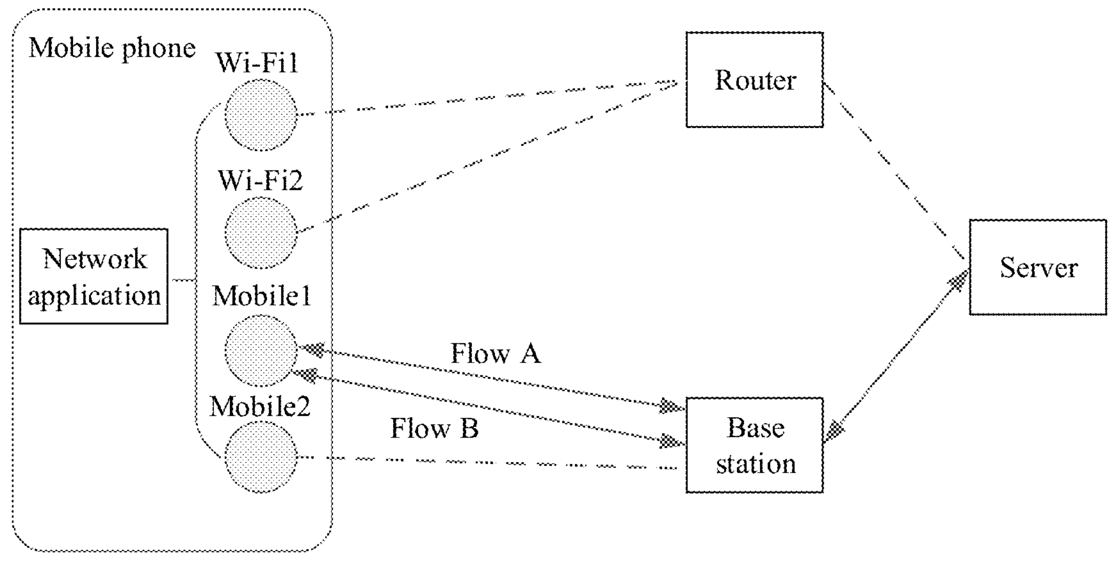

With reference to FIG. 7*a* to FIG. 7*c*, the following describes selection of the secondary network channel by using a mobile phone as an example. As shown in FIG. 7*a*, the mobile phone has four network channels: a primary Wi-Fi channel (for example, Wi-Fi1), a secondary Wi-Fi channel (for example, Wi-Fi2), a primary cellular channel (for example, Mobile1), and a secondary cellular channel (for example, Mobile2). It is assumed that the mobile phone currently runs a network application (for example, WeChat) on a Wi-Fi1 channel (the primary network channel), and the network application includes a flow A (for example, a video flow) and a flow B (for example, an audio flow). After receiving the scenario change notification, the mobile phone may select a secondary network channel in advance, where the secondary network channel may be one of the foregoing secondary Wi-Fi channel (for example, Wi-Fi2), primary cellular channel (for example, Mobile1), and secondary cellular channel (for example, Mobile2) with optimal quality. After one of the foregoing secondary Wi-Fi channel (for example, Wi-Fi2), primary cellular channel (for example, Mobile1), and secondary cellular channel (for example, Mobile2) is selected as the secondary network channel (for example, Mobile1 channel), a path of the Mobile1 channel may be stored.

When the mobile phone detects, through further packet detection, that the quality of the flow A does not meet a requirement, in this case, only the flow A may be switched to the secondary network channel, that is, the Mobile1 channel. As shown in FIG. 7*b*, in this case, the foregoing flow B may still be carried on the primary network channel, that is, the Wi-Fi channel, and the flow A may be carried on the secondary network channel, that is, the Mobile1 channel.

It should be noted that the foregoing example is merely an example of a scenario in which one flow is switched, which does not constitute a limitation on the embodiments of this application. In some embodiments, a scenario in which a plurality of flows are switched may also be included.

Optionally, when the mobile phone detects, through further packet detection, that the quality of the flow A does not meet a requirement, in this case, both the flow A and the flow B may be switched to the secondary network channel, that is, the Mobile1 channel. As shown in FIG. 7C, in this case, both the flow A and the flow B are carried on the Mobile1 channel, and the Wi-Fi1 channel is disabled.

Figure 8A:
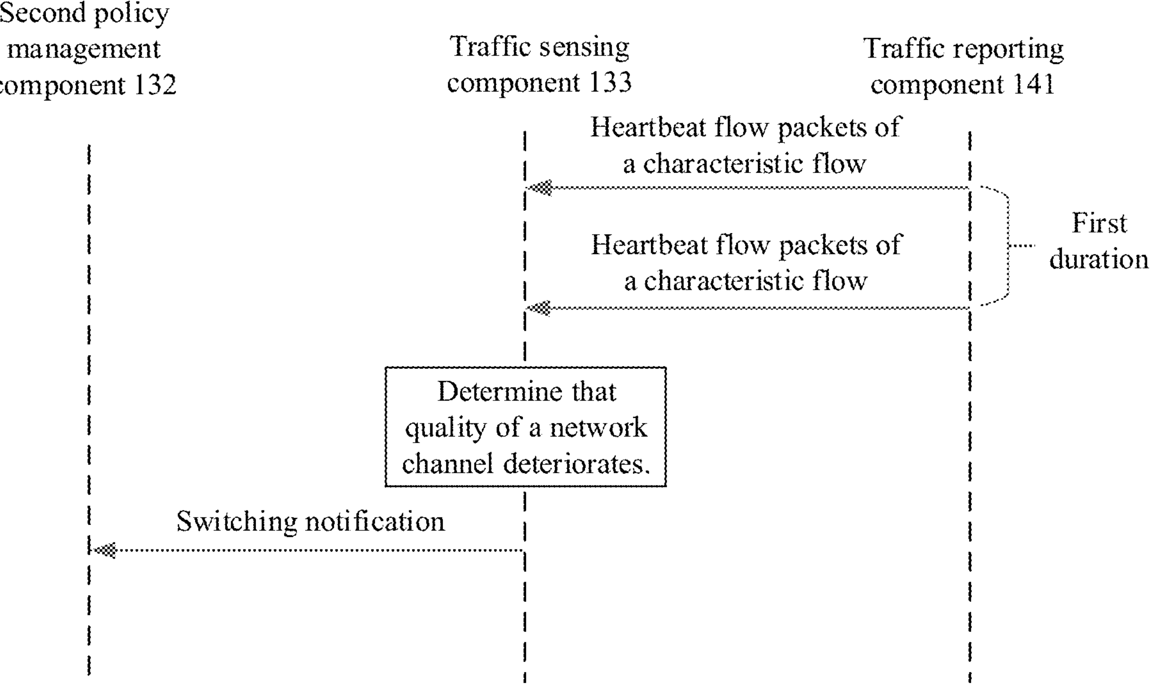
FIG. 8*a* is a schematic diagram of interaction in an insensitive service switching procedure according to an embodiment of this application.
Figure 8B:
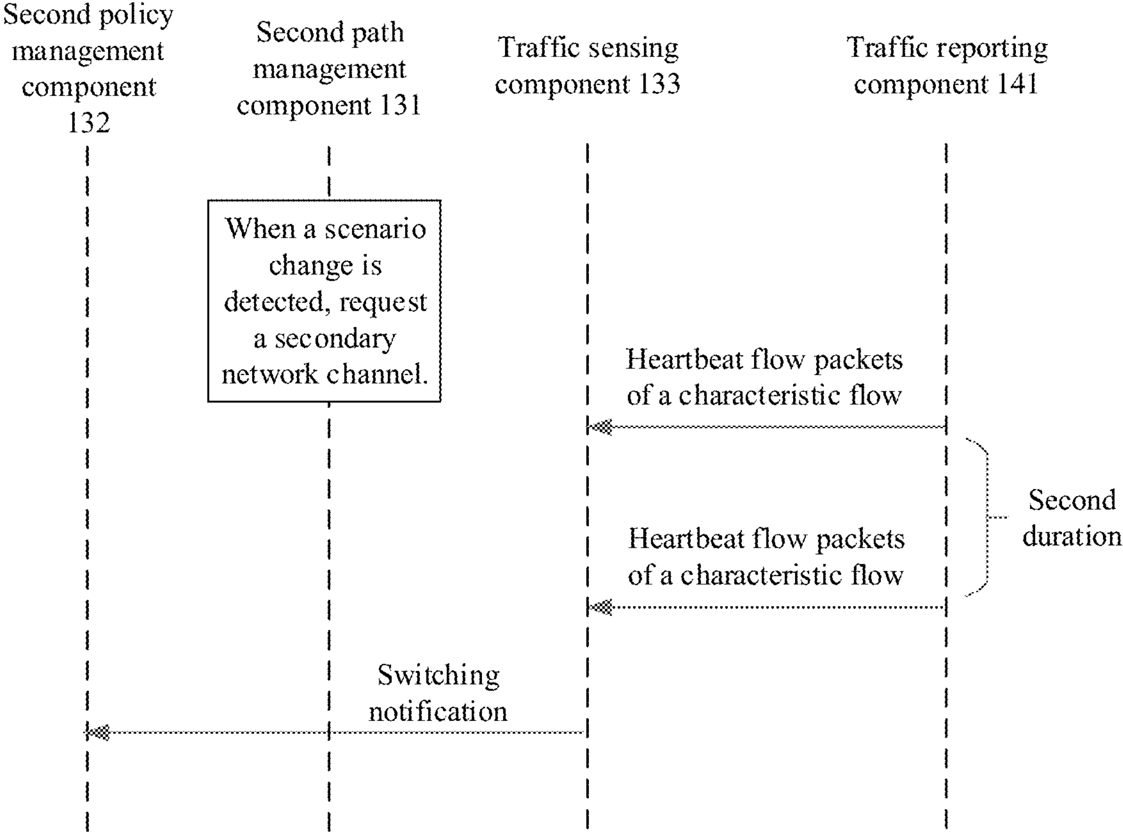
FIG. 8*b* is a schematic diagram of interaction in a sensitive service switching procedure according to an embodiment of this application.

Next, with reference to FIG. 8*a* and FIG. 8*b*, a condition for triggering channel switching is described by using a mobile phone as an example. FIG. 8*a* shows a process of triggering channel switching of an insensitive service. As shown in FIG. 8*a*, the traffic sensing component 133 in the mobile phone receives, within preset first duration, heartbeat flow packets detected by the traffic reporting component 141, and may determine, through statistical analysis on the heartbeat flow packets within the preset first duration, whether quality of a network channel deteriorates. Because a current service is an insensitive service, the foregoing preset first duration may be set to be a relatively long time, for example, 5s. After determining that the quality of the current network channel deteriorates, the traffic sensing component 133 may send a switching notification to the second policy management component 132 to trigger network channel switching. For example, quality of other network channels may be evaluated, and the current insensitive service may be switched to another network channel with optimal quality.

FIG. 8*b* is a process of triggering channel switching of a sensitive service. As shown in FIG. 8*b*, after receiving the scenario change notification message sent by the first policy management component 124, the second path management component 131 in the mobile phone can determine that the scenario changes. In this case, the second path management component 131 may request a secondary network channel, so that when quality of a characteristic flow of the network application deteriorates, the second path management component 131 may switch to the secondary network channel in a timely manner, so as to save switching time and improve user experience. Then, the traffic sensing component 133 in the mobile phone receives, within a preset second duration, the heartbeat flow packets detected by the traffic reporting component 141, and may determine the quality of service of the characteristic flow in the current network application through statistical analysis on the heartbeat flow packets within the preset second duration. The preset second duration may be equal to the preset first duration, for example, 5s, or may be shorter than the preset first duration, for example, 3s. When it is determined that the quality of service of the characteristic flow is deteriorated, the switching notification may be sent to the second policy management component 132, so as to trigger network channel switching. For example, the characteristic flow of the current network application may be switched to the secondary network channel.

Step 415: The first path management component 123 receives a secondary network channel request, and requests an enable status of each optional network channel.

Specifically, after receiving the secondary network channel request sent by the second path management component 131, the first path management component 123 may send a channel status request to the network detection component 122, where the channel status request may be used to request to obtain an enable status of each optional network channel. It can be understood that the foregoing enable status may include an available state and an unavailable state. The available state may be used to represent that the optional network channel may be enabled, and the unavailable state may be used to represent that the optional network channel is disabled. The optional network channel may include a secondary Wi-Fi channel, a primary cellular channel, a secondary cellular channel, and the like.

Step 416: The network detection component 122 detects an enable status of each optional network channel, and sends the enable status of each optional network channel to the first path management component 123.

Specifically, after receiving the channel status request sent by the first path management component 123, the network detection component 122 may detect the enable status of each optional network channel. During specific implementation, the network detection component 122 may be configured to manage a switch of each optional network channel. When any optional network channel is enabled, the optional network channel is in an available state; and when any optional network channel is disabled, the optional network channel is in an unavailable state. Therefore, after detecting the enable status of each optional network channel requested by the first path management component 123, the network detection component 122 may send the enable status of each optional network channel to the first path management component 123.

Step 417: The first path management component 123 requests channel quality of each available network channel.

Specifically, after receiving the enable status of each optional network channel, the first path management component 123 may select an available network channel (that is, an optional network channel in an available state), and may further send a channel evaluation request to the channel and application quality evaluation component 125, where the channel evaluation request may be used to request to evaluate quality of the available network channel.

Step 418: The channel and application quality evaluation component 125 evaluates quality of each available network channel, and sends an evaluation result to the first path management component 123.

Specifically, after receiving the channel evaluation request sent by the first path management component 123, the channel and application quality evaluation component 125 may evaluate the quality of each available network channel according to the channel evaluation request. For example, the channel quality may include a delay, a packet loss rate, a bandwidth, a rate, and the like of the channel. The foregoing evaluation may be evaluating a round-trip time (Round-Trip Time, RTT) of an available network channel, and a network channel with a minimum round-trip time is optimal. Optionally, when there is a historical selection record for the available network channel, that is, the foregoing available network channel has been selected as a network channel, in this case, channel quality may be evaluated based on the foregoing RTT and the historical record, where the historical record may include a historical receiving rate, a quantity of number of historical times when the channel quality is poor, and the like. This embodiment of this application imposes no special limitation on a manner of evaluating the channel quality. After completing quality evaluation on all available network channels in the channel evaluation request, the channel and application quality evaluation component 125 may send the foregoing evaluation result to the first path management component 123.

Step 419: The first path management component 123 determines a secondary network channel based on the evaluation result, and sends a path of the secondary network channel to the second path management component 131.

Specifically, after receiving the evaluation result, the first path management component 123 may select an optimal available network channel as the secondary network channel based on the evaluation result, and may send the path of the secondary network channel to the first path management component 123.

Step 420: The second path management component 131 receives and stores the path of the secondary network channel that is sent by the first path management component 123.

Specifically, after receiving the path of the secondary network channel that is sent by the first path management component 123, the second path management component 131 may pre-store the path of the secondary network channel. It can be understood that, in step 411, only a scenario change is detected, that is, the current network may cause a service to be stalled, but a switching condition is not met. In this case, the electronic device 100 does not switch to the secondary network channel, that is, the electronic device 100 still uses the primary network channel.

For example, after receiving, at a moment t1, the path of the secondary network channel that is sent by the first path management component 123, the second path management component 131 may pre-store the path of the secondary network channel. In this case, the electronic device 100 does not switch to the secondary network channel, that is, the electronic device 100 still uses the primary network channel. Then, when it is detected at a moment t2 that the quality of a characteristic flow of the current network application deteriorates, a switching condition has been reached. In this case, the electronic device 100 may switch the characteristic flow from the primary network channel to the secondary network channel.

Step 421: The traffic reporting component 141 reports traffic to the traffic sensing component 133.

Specifically, the traffic reporting component 141 may continuously detect packets of the current primary network channel, and report the detected packets to the traffic sensing component 133.

Step 422: The traffic sensing component 133 receives the packets reported by the traffic reporting component 141, analyzes the packets to obtain a packet analysis result, and sends the packet analysis result to the second policy management component 132.

Specifically, the packets may be the packets of each flow of a network application on the primary network channel. After receiving the packets, the traffic sensing component 133 may analyze the packets. The packet analysis may be based on characteristics of the packets, so as to identify a characteristic flow, where the characteristic flow may be a flow with highest sensitivity in a network application. For example, the Game For Peace is used as an example. A characteristic flow of the game may be a voice flow, that is, a voice flow has a relatively great impact on the game, and has highest sensitivity. When quality of the voice flow is poor (for example, a delay and a packet loss rate do not meet a requirement), gaming experience of the user is severely affected. Therefore, a voice flow needs to be identified, and voice flow packets in the packets needs to be further collected and analyzed. Therefore, a packet analysis result may be obtained. The packet analysis result may be used to indicate whether the characteristic flow meets a service requirement, for example, whether a delay requirement is met or whether a packet loss rate requirement is met. The packet analysis result may be sent to the second policy management component 132.

The recognition of the voice flow packets may be implemented by collecting statistics on the heartbeat packets. For example, the UDP protocol is used as an example, and characteristics of data voice flow packets may be represented by using the following characteristics:

Uplink: udp.payload[6]=0×64;

Downlink: udp.payload[6]=0×65.

FIG. 9 is a schematic diagram of heartbeat packets of a voice flow in the UDP protocol.

That is, a preset field in the payload in the foregoing uplink and downlink packets is read, so as to identify whether the packets are voice flow packets.

Then, statistics of the voice flow packets may be collected, and therefore, a delay and/or a packet loss rate of the voice flow packets may be obtained. During specific implementation, statistics of the voice flow packets in preset duration (for example, 5s) may be collected. For example, if a delay and/or a packet loss rate of the voice flow packets do not/does not meet a requirement, it may be determined that the quality of the voice flow is poor. In this case, switching may be triggered to switch the voice flow to the secondary network channel. It should be noted that in the foregoing example, only a game is used as an example for description. In a specific application, another network application may be further included. For example, for the Baidu Network Disk, a characteristic flow of the network application is a download flow, that is, a packet of the download flow may be found in the foregoing packets, and a factor that affects the packet of the download flow may be a rate. In addition, the network application may further include a social network application such as WeChat. A characteristic flow of the network application is a video flow, that is, a packet of the video flow may be found in the foregoing packets, and a factor that affects the packet of the video flow may be a delay/or a packet loss rate.

Figure 10:
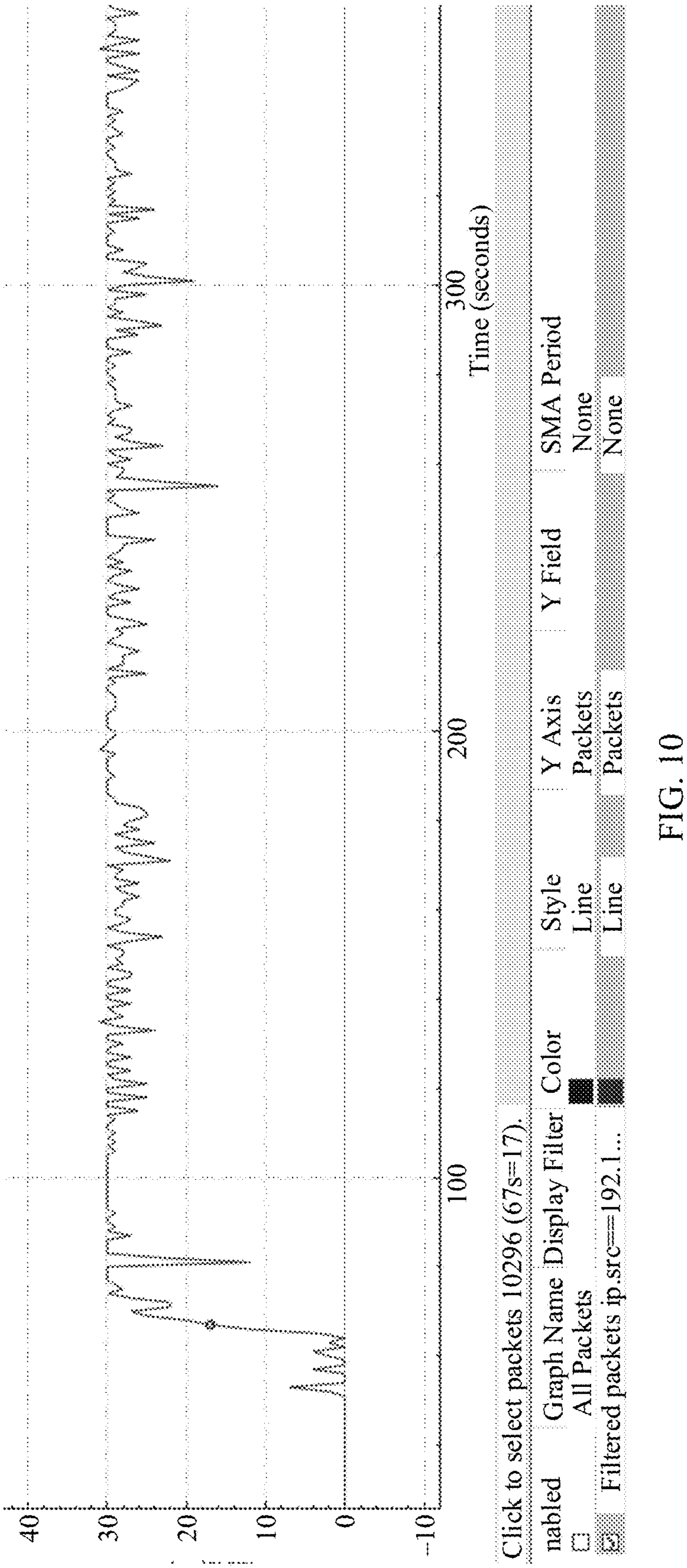
FIG. 10 is a schematic diagram of statistics of packets in a battle flow according to an embodiment of this application.

It can be understood that in addition to the foregoing voice flow, the characteristic flow may further include a gaming flow. Using the Game For Peace as an example, a quantity of UDP packets can be counted periodically to determine whether the current packet flow is a battle flow. Currently, the UDP packets of the Game For Peace are counted based on a period of 500 ms. Therefore, a total quantity of packets in the period may be counted to determine whether the packet is a battle flow. For example, if the total quantity of packets in the period of 500 ms is greater than 10, the packet flow is a battle flow. FIG. 10 is a schematic diagram of packet statistics of a battle flow in the UDP protocol. As shown in FIG. 10, a horizontal axis indicates a time, and a vertical axis indicates a total quantity of packets. Because almost 30 packets are kept per second, 15 packets per 500 ms may be determined through calculation. Therefore, it may be determined that the packet flow is a battle flow.

Next, the Honor of Kings is used as an example. For the Honor of Kings, a UDP protocol number and a packet header characteristic "payload=0×00010000" are used to filter battle packets. FIG. 11 is a schematic diagram of heartbeat packets of a battle flow in the UDP protocol.

Step 423: The second policy management component 132 determines switching based on a packet analysis result, and requests to obtain the path of the secondary network channel.

Specifically, after receiving the packet analysis result reported by the traffic sensing component 133, the second policy management component 132 may determine, based on the packet analysis result, whether to perform channel switching. During specific implementation, if a characteristic flow of the current network application (for example, a voice flow in a game, a video flow in WeChat, or a download flow of the Baidu Network Disk) does not meet a requirement (for example, a delay and/or a packet loss rate), it may be determined that channel switching needs to be performed. In this case, the second policy management component 132 may send a secondary network channel path obtaining request to the second path management component 131, so as to obtain the path of the secondary network channel. For example, if the secondary network channel is a primary cell, the path of the secondary network channel may be, for example, Mobile1.

For example, the requesting the path of the secondary network channel may be implemented by using the following code:

```
private boolean requestNetwork( ){
    Log.i(TAG,                                  "requestNetwork,
pathId="+mChannelId+"slotId="+mSlotId+"mSubId")
    If(mConnectivityManager==NULL{
        Log.e(TAG, "requestNetwork, mConnectivityManager is NULL");
        return false;
    }
    If(!Utils.isValidSubId(mSubId)){
        Log.e(TAG, "requestNetwork, invalid subId: "+mSubId);
        return false;
    }
    NetworkRequest.Builder builder=new NetworkRequest.Builder( );
    builder.addCapability(NetworkCapabilities.NET_CAPABILITY_INTERNET);
    builder.addTransportType(NetworkCapabilities. Transport_CELLULAR);
    builder.remove
Capability(NetworkCapabilities.NET_CAPABILITY_NOT_RESTRICTED);
    builder.setNetworkSpecifier(String.valueOf(mSubId));
    NetworkRequest build=builder.build( );
mConnectivityManager.requestNetwork(build,this,(int)GET_PATH_RESPONSE_TIMER_MS);
    return true;
}
```

In addition, during specific implementation, the path of the network channel (for example, the path may be represented by a device number of a network adapter or a SIM card) may be defined in a data structure. Example code is as follows:

```
struct sock{
            struct sock_common          _sk_common
#define     sk_node                     _sk_common.skc node
#define     sk_nulls_node               _sk_common.skc_nulls_node
#define     sk_refcnt                   _sk_common.skc_crefcnt
#define     sk_tx_queue_mapping         _sk_common.skc_tx_queue_mapping
#define     sk_dontcopy_begin           _sk_common.skc_dontcopy_begin
#define     sk_dontcopy_end             _sk_common.skc_dontcopy_end
#define     sk_hash                     _sk_common.skc_hash
#define     sk_portpair                 _sk_common.skc_portpair
#define     sk_num                      _sk_common.skc_num
#define     sk_dport                    _sk_common.skc_dport
#define     sk_addrpair                 _sk_common.skc_addrpair
#define     sk_daddr                    _sk_common.skc_daddr
#define     sk_rcv_saddr                _sk_common.skc_saddr
#define     sk_family                   _sk_common.skc_family
#define     sk_state                    sk_common.skc_state
#define     sk_reuse                    _sk_common.skc_reuse
#define     sk_reuseport                _sk_common.skc_reuseport
#define     sk_ipv6only                 _sk_common.skc_ipv6only
#define     sk_net_refcnt               _sk_common.skc_net_refcnt
#define     sk_bound_dev_if             _sk_common.skc_bound_dev_if
#define     sk_bind_node                _sk_common.skc_bind_node
#define     sk_prot                     _sk_common.skc_prot
#define     sk_net                      _sk_common.skc_net
#define     sk_v6_daddr                 _sk_common.skc_v6_daddr
#define     sk_v6_rcv_saddr             _sk_common.skc_v6_rcv_saddr
#define     sk_cookie                   _sk_common.skc_cookie
#define     sk_incoming_cpu             _sk_common.skc_incoming_cpu
```

-continued

```
#define     sk__flags                    __sk__common.skc__net__flags
#define     sk__rxhash                   __sk__common.skc__rxhash
#ifdef CONFIG__HW__DPIMARK__MODULE
#define     sk__hwdpi__mark              __sk__common.skc__ hwdpi__mark
}
```

As shown in the foregoing code, sk_bound_dev_if is a device number of a target network interface card or target SIM card to be switched. It can be understood that a packet may be received by using the foregoing network adapter or the SIM card. For code for receiving the packet, refer to the following example:

pktinfo.msg.flow_msg.dev_if=sk→sk_bound_dev_if;

"pktinfo" is a received packet, and "msg.flow_msg" is a name of the packet flow.

It can be understood that if it is determined, through packet analysis, that the characteristic flow of the current network application meets a requirement, that is, switching is not required, and in this case, the first device 10 may delete the path of the secondary network channel, so as to release a resource and save power consumption of the first device 10. Optionally, the first device 10 may delete the path of the secondary network channel after preset duration (for example, preset third duration). Therefore, it can be ensured that if the quality of the characteristic flow deteriorates within the preset third duration, the first device 10 can switch to the secondary network channel in a timely manner, so as to avoid that switching cannot be performed because the path of the secondary network channel is deleted.

It should be noted that because the electronic device 100 may be in different environments, wireless networks are quite different. For example, when the electronic device 100 detects that the network environment in which the electronic device 100 is currently located is relatively poor, the secondary network may be activated. Then, when the electronic device 100 detects that the current service meets a service requirement, switching is not required (for example, the electronic device 100 enters a relatively good network environment), the electronic device 100 may continue to use the current network, and does not switch to the secondary network. Therefore, the electronic device 100 may perform only detection of the secondary network, for example, perform step 415 to step 420 to complete detection of the secondary network. Further, after completing detection of the secondary network, the electronic device 100 may further activate the secondary network. The activation operation may accelerate a switching procedure, thereby reducing a switching delay. That is, when detecting a current environment (for example, an elevator scenario) in which the electronic device 100 is located, the electronic device 100 may only perform detection of the secondary network, or may detect the secondary network and activate the secondary network. However, switching is not actually performed in the detection phase of the secondary network and during activation of the secondary network. When detecting that the current service cannot meet a service requirement, the electronic device 100 may switch the current service (for example, one or more flows of the current service) to the activated secondary network.

Step 424: The second policy management component 132 sends the path of the secondary network channel to the second path management component 131.

Step 425: The second policy management component 132 sends a channel switching indication to the policy execution component 142.

Specifically, after receiving the path of the secondary network channel that is sent by the second path management component 131, the second policy management component 132 may send the channel switching indication to the policy execution component 142, where the channel switching indication may be used to indicate the policy execution component 142 to switch the foregoing characteristic flow from the current primary network channel to the secondary network channel, so that channel switching is completed more quickly, thereby reducing a delay caused by channel switching and improving user experience.

Step 426: The policy execution component 142 performs channel switching.

Specifically, after receiving the channel switching indication sent by the second policy management component 132, the policy execution component 142 may switch the foregoing characteristic flow from the current primary network channel to the secondary network channel. That is, another flow of the foregoing network application may still be carried on the primary network channel, and the foregoing characteristic flow may be carried on the secondary network channel, so that switching can be quickly completed, thereby ensuring quality of service and user experience.

Optionally, the entire network application may be switched to the secondary network channel, that is, the primary network channel may be disabled, and all flows of the network application are carried on the secondary network channel for running.

Figure 12:
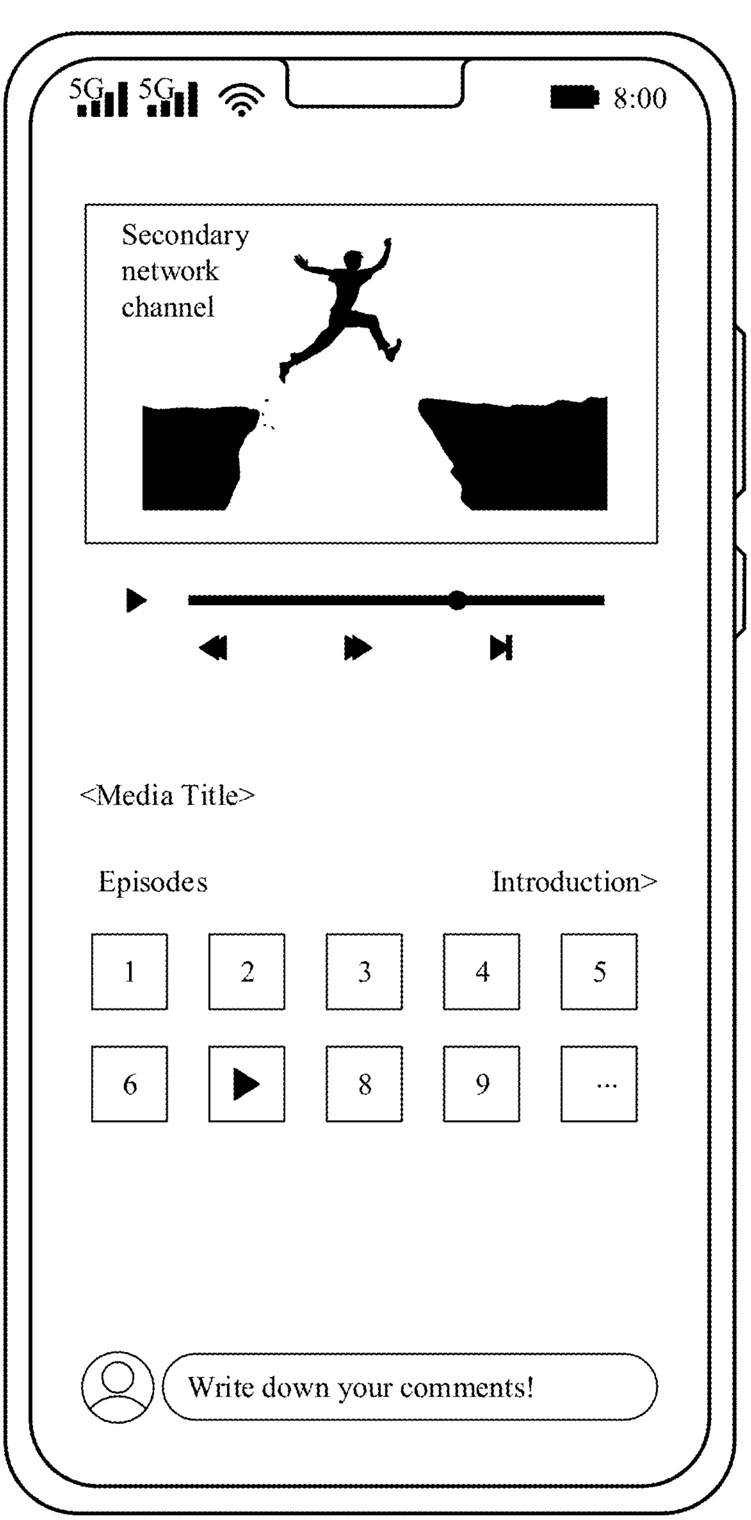
FIG. 12 is a schematic diagram of an application interface for using a secondary network channel by a mobile phone according to an embodiment of this application.

FIG. 12 is a schematic diagram of using a secondary network channel by a mobile phone. As shown in FIG. 12, after the mobile phone receives the channel switching indication, the mobile phone may switch a video flow from the current primary network channel to the secondary network channel, and may use the secondary network channel to watch the video, so as to avoid freezing of the video.

It can be understood that the interface connection relationship between the modules illustrated in the embodiments of this application is merely an example for description, and does not constitute a limitation on the structure of the electronic device 100. In some other embodiments of this application, the electronic device 100 may alternatively use an interface connection mode that is different from those in the foregoing embodiments, or use a combination of a plurality of interface connection modes.

It can be understood that, to implement the foregoing functions, the foregoing electronic device includes corresponding hardware structures and/or software modules for performing the functions. A person skilled in the art should easily realize that, with reference to the units and algorithm steps described in the embodiments disclosed in this specification, the embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the foregoing electronic device and the like may be divided into functional modules based on the foregoing method examples. For example, each functional module may be obtained through division for a corresponding function, or two or more functions may be integrated into one processing module. The foregoing integrated module may be implemented in a form of hardware, or may be implemented in a form of a software functional module. It should be noted that the module division in this embodiment of this application is an example and is merely logical function division, and there may be another division manner during actual implementation.

The foregoing descriptions about implementations allow a person skilled in the art to clearly understand that, for the purpose of convenient and brief description, division of the foregoing functional modules is used only as an example for illustration. In actual application, the foregoing functions can be allocated to different functional modules and implemented according to needs, that is, an inner structure of an apparatus is divided into different functional modules to implement all or some of the functions described above. For the specific working processes of the system, apparatus and units described above, reference may be made to the corresponding processes in the above-mentioned method embodiments. Details are not described herein again.

Functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such understanding, the technical solution of this embodiment of this application which is essential or a part contributing to the prior art or all or a part of the technical solution may be embodied in the form of a software product, and the computer software product is stored in a storage medium and includes several instructions for enabling a computer device (which may be a personal computer, a server or a network device) for a processor to perform all or some steps of the method according to each embodiment of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. An electronic device, comprising: an acceleration sensor, a memory and a processor, wherein the memory is configured to store instructions that, when executed by the processor, causes the electronic device to:

in response to a monitored scenario change that is associated with a movement of the electronic device, detect a second network channel based on a service type of a first application, and determine a path of the second network channel based on a detection result, wherein the monitored scenario change is determined by detecting a movement of the electronic device in a vertical direction by the acceleration sensor;

obtain packets of the first application on a first network channel; and determine a characteristic packet flow from a plurality of packet flows of the first application, collecting statistics on packets in the characteristic packet flow to obtain a first statistical result, and switch the characteristic packet flow to the path of the second network channel based on the first statistical result.

2. The electronic device according to claim 1, wherein the first network channel or the second network channel comprises at least a primary Wi-Fi channel, a secondary Wi-Fi channel, a primary cellular channel, or a secondary cellular channel.

3. The electronic device according to claim 1, wherein the characteristic packet flow comprises at least one of a download flow, a video flow, or a gaming flow.

4. The electronic device according to claim 1, wherein the first application is an insensitive application, and the electronic device is further to:

collect statistics on packets of the characteristic packet flow of the first application to obtain a second statistical result, and determining quality of the first network channel based on the second statistical result;

detect the second network channel based on the quality of the first network channel, and determining the path of the second network channel based on a detection result; and switch the characteristic packet flow to the second network channel.

5. The electronic device according to claim 4, wherein the electronic device is further to:

collect statistics on the packets that are in the characteristic packet flow of the first application and that are received within preset first duration, to obtain the second statistical result.

6. The electronic device according to claim 1, wherein the first application is a sensitive application.

7. The electronic device according to claim 6, wherein the electronic device is further to:

obtain the packets of the first application on the first network channel within a preset second duration.

8. The electronic device according to claim 6, wherein the electronic device is further to:

detect a round-trip delay of a packet of the second network channel based on the service type of the first application to obtain a detection result, wherein the detection result comprises the round-trip delay of a packet of each network channel; and determine the path of the second network channel based on the detection result.

9. The electronic device according to claim 8, wherein the detection result further comprises a historical record of each network channel.

10. The electronic device according to claim 1, wherein the electronic device is further to:

after switching the characteristic packet flow to the second network channel based on the first statistical result, carry a non-characteristic packet flow of the first application on the first network channel.

11. The electronic device according to claim 10, wherein the electronic device is further to:

after switching the characteristic packet flow to the second network channel based on the first statistical result, switch the non-characteristic packet flow in the first application to the second network channel, and disable the first network channel.

12. The electronic device according to claim 1, wherein the electronic device is further to:

delete the path of the second network channel based on the first statistical result.

13. The electronic device according to claim 12, wherein the electronic device is further to:

delete the path of the second network channel after preset fourth duration based on the first statistical result.

14. The electronic device according to claim 1, wherein the electronic device is further to:

collect statistics on a delay or a packet loss rate of the packets in the characteristic packet flow to obtain the first statistical result, wherein the first statistical result is used to indicate whether the characteristic packet flow meets a preset delay requirement or a preset packet loss rate requirement.

15. A method, applied to an electronic device, wherein the electronic device has an acceleration sensor and a plurality of network channels, a first application runs on the electronic device, the first application is carried on a first network channel, the first application comprises a plurality of packet flows, and the method comprises:

in response to a monitored scenario change that is associated with a movement of the electronic device, detecting a second network channel based on a service type of the first application, and determining a path of the second network channel based on a detection result, wherein the monitored scenario change is determined by detecting a movement of the electronic device in a vertical direction by the acceleration sensor;

obtaining packets of the first application on the first network channel; and determining a characteristic packet flow from a plurality of packet flows of the first application, collecting statistics on packets in the characteristic packet flow to obtain a first statistical result, and switching the characteristic packet flow to the path of the second network channel based on the first statistical result.

16. The method according to claim 15, wherein the characteristic packet flow comprises at least one of a download flow, a video flow, or a gaming flow.

17. A non-transitory computer readable storage medium, storing an instruction, and when the instruction is run on an electronic device that has an acceleration sensor and a plurality of network channels, the electronic device is enabled to:

run a first application that is being carried on a first network channel, the first application comprises a plurality of packet flows;

in response to a monitored scenario change that is associated with a movement of the electronic device, detect a second network channel based on a service type of the first application, and determine a path of the second network channel based on a detection result, wherein the monitored scenario change is determined by detecting a movement of the electronic device in a vertical direction by the acceleration sensor;

obtaining packets of the first application on the first network channel; and determining a characteristic packet flow from a plurality of packet flows of the first application, collecting statistics on packets in the characteristic packet flow to obtain a first statistical result, and switching the characteristic packet flow to the path of the second network channel based on the first statistical result.

18. The computer readable storage medium according to claim 17, wherein the characteristic packet flow comprises at least one of a download flow, a video flow, or a gaming flow.

* * * * *